United States Patent [19]
Griffth et al.

[11] Patent Number: 5,524,263
[45] Date of Patent: * Jun. 4, 1996

[54] METHOD AND APPARATUS FOR PARTIAL AND FULL STALL HANDLING IN ALLOCATION

[75] Inventors: James S. Griffth, Aloha; Shantanu R. Gupta; Narayan Hegde, both of Beaverton, all of Oreg.

[73] Assignee: Intel Corporation, Santa Clara, Calif.

[ * ] Notice: The term of this patent shall not extend beyond the expiration date of Pat. No. 5,446,912.

[21] Appl. No.: 201,560

[22] Filed: Feb. 25, 1994

[51] Int. Cl.⁶ .................................................. G06F 9/30
[52] U.S. Cl. .................. 395/800; 395/375; 364/DIG. 1; 364/231.8; 364/262.4; 364/263; 364/232.23; 364/232.22
[58] Field of Search ................................ 395/800, 375

[56] References Cited

U.S. PATENT DOCUMENTS

| | | | |
|---|---|---|---|
| 4,901,233 | 2/1990 | Liptay | 395/375 |
| 4,903,196 | 2/1990 | Pomerence et al. | 395/375 |
| 4,992,938 | 2/1991 | Cocke et al. | 395/375 |

OTHER PUBLICATIONS

Val Popescu, et al. entitled, "The Metaflow Architecture," IEEE Micro, Jun. 1991, pp. 10–13, 63–73.

Author, Mike Johnson, entitled *Superscalar Microprocessor Design*, Advance Micro Devices, Prentice Hall Series in Innovative Technology, 1991, pp. 1–289.

Butler et al; "An Area–Efficient Register Alias Table for Implementing HPS"; Aug. 1990.

Vieghara et al., "An On–Chip Smart Memory for a Data--flow CPU", Feb. 1990 IEEE.

"Vector Register Allocation" IBM TDB Apr. 1990.

Vieghara et al "An Experimental Single Chip Data Flow CPU"; 1990; IEEE.

Sohi; "Instruction Issue Logic for High–Performance, Interruptible, Multiple functional Unit"; Pipelined Computer; Mar. 1990 IEEE.

Gwennap; "Intel, HP ally on New Processor Architecture"; Micro Processor Report., Jun. 1994.

Gwennap., "NexGen enters Market with 66 MHz Nx 586", Micro Processor Report Mar. 1994.

*Primary Examiner*—Eric Coleman
*Assistant Examiner*—L. Donaghue
*Attorney, Agent, or Firm*—Blakely, Sokoloff, Taylor & Zafman

[57] ABSTRACT

A method and apparatus for handling resource allocation during processor stall conditions. The instruction issue components of a processor are stalled (e.g., the issuance of new instruction is frozen) as a result of various stall conditions. One stall condition (full stall) occurs when an allocated buffer resource becomes full. Another stall condition (partial stall) occurs during register renaming and a given instruction sources a larger register width than the register alias table currently contains within the RAT buffer. This is a partial width data dependency and a partial stall is asserted. The present invention, upon detection of a full stall, does not allocate any buffer entries within the clock cycle that causing the full stall and resource pointers are not advanced and instructions issued during that clock cycle are not allocated. Within the clock cycle of the deassertion of the full stall, the resource buffers are allocated and the resource allocation pointers are updated. The present invention, upon detection of a partial stall, allocates a partial number of instructions within the clock cycle that causes the partial stall and updates a retirement entry pointer to the ROB but does not advance the resource pointers. Upon the clock cycle of the deassertion of the partial stall, the remainder of the instructions are allocated to the resource buffers and the resource pointers are advanced. In the event a full and partial stall are asserted concurrently, the full stall takes priority.

47 Claims, 20 Drawing Sheets

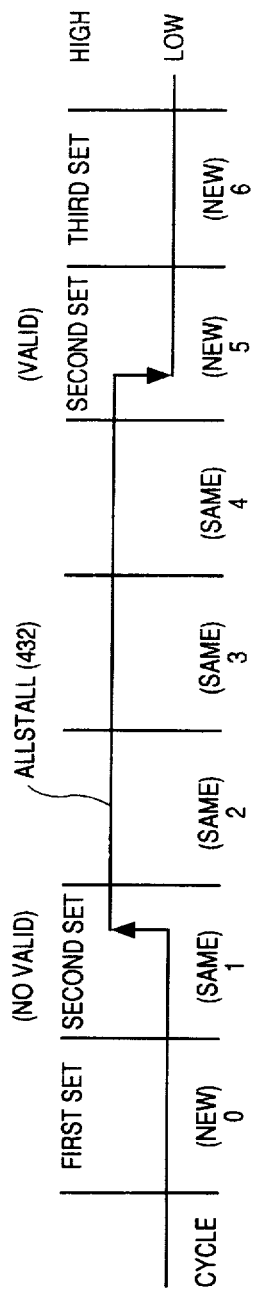
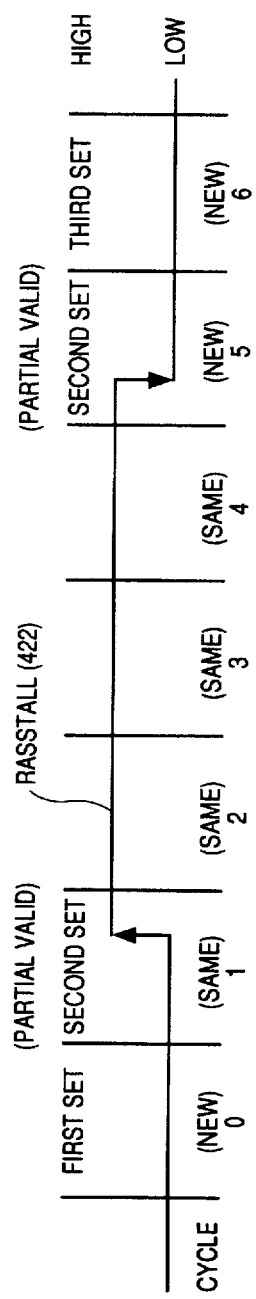
FIG. 18A
FIG. 18B

METHOD AND APPARATUS FOR PARTIAL AND FULL STALL HANDLING IN ALLOCATION

FIELD OF THE INVENTION

The present invention relates to the field of computer systems; more particularly, the present invention relates to allocating buffer resources to instructions processed by a processor during stall conditions.

BACKGROUND OF THE INVENTION

Superscalar microprocessor are capable of processing multiple instructions within a common clock cycle. Pipelined microprocessors divide the processing (from dispatch to retirement) of an operation into separate pipe stages and overlap the pipestage processing of subsequent instructions in an attempt to achieve single pipestage throughput performance. Both pipelined and superscalar microprocessors are well known. Speculative execution of instructions by a microprocessor involves the microprocessor making a branch prediction of a particular program pathway given a particular branch condition. By predicting a given branch pathway, the front end of the microprocessor may process instructions while keeping the pipeline full of information before the actual branch is resolved. Provided the prediction was accurate, the microprocessor receives a large performance gain by maintaining the pipeline full of information before the branch is resolved. However, until it is known that the correct program path was taken, the information processed by the microprocessor from the branch point forward is called "speculative" information. If the checking logic of the microprocessor determines that the microprocessor mispredicted, the speculative information must be purged and the pipeline restarted at the correct program pathway.

Out-of-order processing within a microprocessor involves allowing instructions to be processed out of their program order to gain performance and increase parallelism and efficient resource usage. True data dependent instructions are not executed out-of-order, but often many instructions within a program order do not directly depend on the results of earlier instructions. These instruction may be executed (or processed) out-of-order if the microprocessor contains sufficient resources that can be used in such an efficient manner. Obviously, some instructions may not be executed out-of-order. For instance, a load from a given address must not be executed out-of-order and before an earlier store that writes to that same address. However, for other instructions that are not necessarily data or otherwise dependent, out-of-order execution allows a large performance gain over an in-order microprocessor. For a detailed explanation of speculative out-of-order execution, see M. Johnson, *Superscalar Microprocessor Design*, Prentice Hall, 1991. Speculative and out-of-order execution offer advantages over the prior art, including better use of resources. If multiple instructions are permitted to be executed at the same time (superscalar), this performance benefit greatly increases.

A microprocessor that is pipelined, superscalar, allows speculative execution and further allows out-of-order processing, creates a great demand on its internal resources. For that matter, any advanced microprocessor places a high demand on its internal resources. Therefore, it is advantageous to utilize the internal resources of the microprocessor as efficiently as possible. Certain conditions arise with a microprocessor that cause the instruction fetch, decode and issue portions of the microprocessor to stall (e.g., freeze the issuance of new instructions) until the stalling conditions are removed. Them are different types of stalling conditions that have different effects on the microprocessor such as a full stall and a partial stall conditions. As background, the generation of the partial stall is described in detail within a copending application assigned to the assignee of the present invention, Ser. No. 08/174,841, entitled, "Partial Width Stalls within Register Alias Table," and filed on Dec. 29, 1993. The partial stall is generated by a register alias table as a result of data dependencies between instructions accessing different widths of the same register. The present invention offers an advantageous solution to buffer resource allocation during different stalling conditions.

More specifically, advanced microprocessors, as described above, utilize a number of specialized buffers as resources to perform a number of different tasks and operations. Load and store buffers are well known resources used by microprocessors. A reservation station buffer resource may be used as a holding buffer for instructions that have been decoded and are awaiting their source data to become available so they can be executed. A reorder buffer is used to buffer results of speculative execution and provided a larger set of registers for register renaming. The present invention offers an advantageous solution to handling allocation to the above resources during various stall conditions.

Accordingly, it is an object of the present invention to increase resource use efficiency within an advanced microprocessor. It is further an object of the present invention to offer a microprocessor with beneficial allocation handling during various stall conditions. It is object of the present invention to provide different allocation techniques to buffer resources based on different stall conditions. It is further an object of the present invention to provide an allocation mechanism operable during a stall caused by buffer resource unavailability. It is another object of the present invention to provide an allocation mechanism operable during a stall caused by data dependencies between speculative instructions accessing partial register widths. These and other objects not specifically mentioned above will become clear in view of the discussions of the present invention to follow.

SUMMARY OF THE INVENTION

A method and apparatus for handling resource allocation during processor stall conditions is described. The instruction issue components of a processor are stalled (e.g., the issuance of new instruction is :frozen) as a result of various stall conditions. One stall condition (:full stall) occurs when an allocated buffer resource becomes full. Another stall condition (partial stall) occurs during register renaming and a given instruction sources a larger register width than the register alias table currently contains within the RAT buffer for that register. This is a partial width data dependency and a partial stall is thereupon asserted. The present invention, upon detection of a full stall, does not allocate any buffer entries within the clock cycle that causing the full stall and instructions issued during that clock cycle are not allocated and resource pointers are not advanced. Within the clock cycle of the deassertion of the full stall, the resource buffers are allocated and the resource allocation pointers are updated. The present invention, upon detection of a partial stall, allocates a partial number of instructions within the clock cycle that causes the partial stall and advances only a retirement pointer to the ROB but not the resource pointers. Upon the clock cycle of the deassertion of the partial stall, the remainder of the instructions are allocated to the resource buffers and the resource pointers are updated. In the event a full and partial stall are asserted concurrently, the full stall takes priority.

Specifically, embodiments of the present invention include, a mechanism for allocating resources of a processor to a first and a second instruction issued by the processor within a common clock cycle, the mechanism including: a first buffer for maintaining source operand and destination register information associated with speculative instructions; a second buffer for containing information associated with instructions pending execution by the processor; allocation logic for suspending allocation of the first instruction and the second instruction in response to a full stall condition, wherein the full stall condition is asserted if the first buffer or the second buffer is full; and wherein the allocation logic is also for allocating entries of the first buffer and the second buffer to the first instruction in response to a partial stall condition while suspending allocation of the second instruction in response to the partial stall condition, wherein the partial stall condition is asserted in response to partial register width data dependency between the second instruction and a previous instruction.

Embodiments of the present include the above and wherein the allocation logic is also for allocating the second instruction in response to deassertion the partial stall condition and wherein the allocation logic is also for allocating the first instruction and second instruction in response to deassertion of the full stall condition. Embodiments of the present invention include the above and wherein the partial stall condition is asserted in response to the previous instruction writing to a first partial width of a given register and the second instruction reading a second partial width of the given register, wherein the second partial width is a superset of the first partial width.

The present includes the above and further comprising: a third buffer for containing information associated with load instructions; a fourth buffer for containing information associated with store instructions; and wherein the allocation logic is also for suspending allocation of the first and the second instructions in response to the full stall condition, wherein the full stall condition is also asserted if the third buffer or the fourth buffer is full; and wherein the allocation logic is also for allocating entries of the third buffer and the fourth buffer to the first instruction in response to the partial stall condition while suspending allocation of the second instruction in response to the partial stall condition.

The present invention includes a processor implemented with the above mechanism and a computer system implemented with the above processor. The present invention also includes a method implemented in accordance with the above.

BRIEF DESCRIPTION OF THE DRAWINGS

FIG. 18(A) is a timing diagram illustrating the assertion and deassertion of the full stall condition.

FIG. 18(B) is a timing diagram illustrating the assertion and deassertion of the partial stall condition.

DETAILED DESCRIPTION OF THE PRESENT INVENTION

Figure 1:
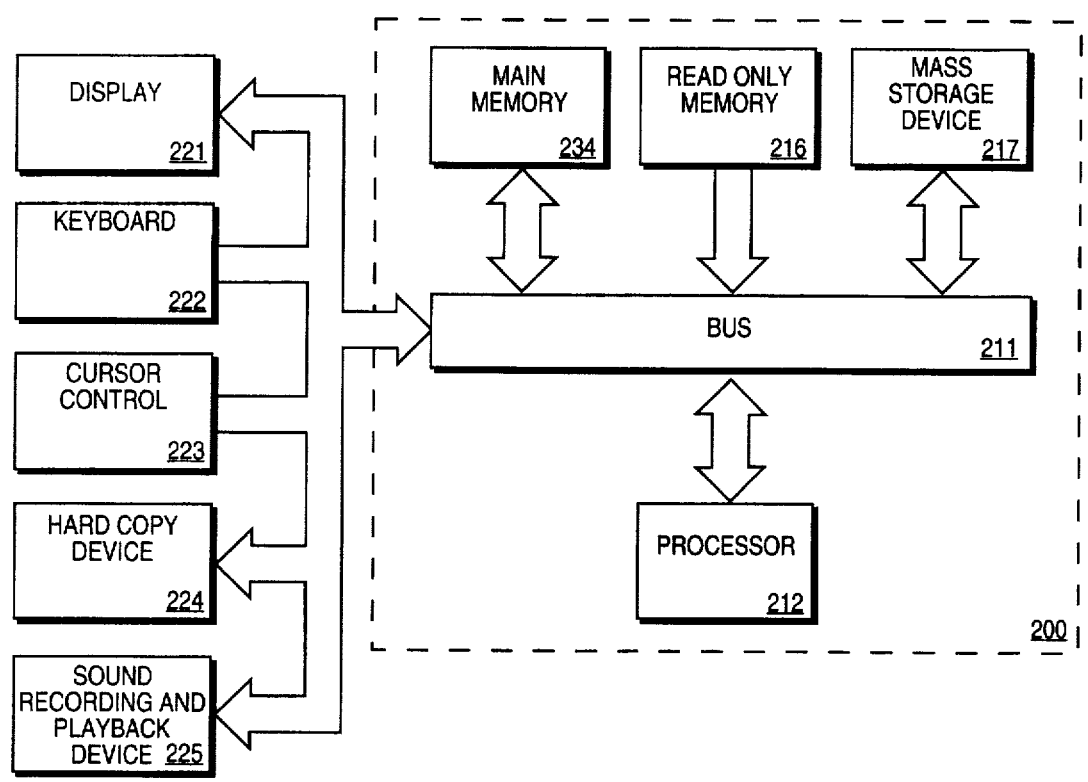
FIG. 1 is a block diagram of the present invention computer system.

The present invention includes an apparatus and method for allocating resources of a processor during a full stall and during a partial stall condition, the resources including a load buffer, a store buffer, a reorder buffer and a reservation station. In the following detailed description of the present invention numerous specific details are set forth, such as specific number of bits, address sizes, buffer sizes, etc., in order to provide a thorough understanding of the present invention. However, it will be obvious to one skilled in the art that the present invention may be practiced without these specific details. In other instances, well-known structures and devices are shown in block diagram form, rather than in detail, in order to avoid unnecessarily obscuring aspects of the present invention.

PART I—OVERVIEW

The present invention provides allocation schemes for two different types of stall conditions that may arise within the processor of the present invention that is discussed more fully below. The allocator of the present invention allocates entries to the buffer resources. Hereinafter, the buffer resources include the reorder buffer, the reservation station, the load buffer, and the store buffer. The processor of the present invention is superscalar and may issue as many as three or four instructions (e.g., a current set) in a common clock cycle. The first stall condition handled by the allocation mechanism of the present invention is generated by the register alias table and is referred to herein as the RA Stall or partial stall condition. This stall arises when there are partial register width data dependencies within the currently issued instructions. The RA Stall signal also freezes the issue unit of the processor. When this occurs, some of the currently issued instructions (as well as the entire issue unit of the processor) must be stalled until the others retire and then the stalled or "suspended" instructions may be allocated. When this occurs, the allocator unit of the present invention allocates some of the currently issued instructions but does not allocate the stalled instructions and will not update the internal buffer pointers. However, a special reorder buffer, ROB, pointer, the AL_NEXT_Pdst pointer is incremented and forwarded to the ROB and is used by the ROB so that the partially allocated instructions may be properly retired. Within the clock cycle that the RA Stall is deasserted, the present invention allocates the stalled instructions and then updates the internal buffer pointers. Upon the subsequent clock cycle after the deassertion of the RA Stall, new resource entries are allocated for the subsequent clock cycle.

The second stall condition arises when a resource is full and no longer offers an available entry for the currently issued instructions. Within such a clock cycle, the allocator generates an AL Stall or full stall signal. When this occurs, the allocator of the present invention does not allocate any of the instructions of the current set and does not advance the internal buffer pointers. The AL Stall signal also freezes the issue unit of the processor. Within the cycle that the AL Stall signal is deasserted, the allocator allocates the stalled instructions to the buffer resources and then advances the internal buffer pointers. Therefore, during partial stall, the present invention allows proper partial allocation and during full stall the present invention does not perform any allocation to the buffer resources.

The present invention allocation handling during the above stall conditions will be described in further detail hereinafter. However, below is a discussion of the hardware environment of the present invention describing the processor of the present invention, and therewithin, the load buffer, the store buffer, the reorder buffer and the reservation station which comprise the buffer resources allocated by the present invention. It is appreciated that aspects of the present invention concern the allocation handling of the above resources during different stall conditions. However, for completeness, the resources themselves are described in addition to the allocation handling of the present invention.

PART II—HARDWARE ENVIRONMENT

Referring to FIG. 1, the computer system upon which a preferred embodiment of the present invention is implemented is shown as system 200. Computer system 200 comprises an external address/data bus or other communication mechanism 211 for communicating information within the system, and a processing mechanism 212 coupled with bus 211 for executing instructions and processing information. Processor 212 includes, but is not limited to microprocessors such as an Intel Architecture Microprocessor, manufactured by Intel Corporation of Santa Clara, Calif., processor 212 may also be another microprocessor such as the PowerPC™, Alpha™, etc. and may be implemented using silicon or gallium arsenide. Processor 212 may be implemented on a single chip or within multiple chips. System 200 further comprises a random access memory (RAM) or other dynamic storage device 214 (referred to as main memory), coupled to the external system bus 211 for storing information and instructions to be executed by processor 212. Main memory 234 also may be used for storing temporary variables or other intermediate information during execution of instructions by processor 212. Computer system 200 also comprises a read only memory (ROM) and/or other static storage device 216 coupled to bus 211 for storing static information and instructions for processor 212, and a data storage device 217 such as a magnetic disk or optical disk and its corresponding disk drive. Data storage device 217 is coupled to bus 211 for storing information and instructions.

Computer system 200 may further be coupled to an output display device 221, such as a cathode ray tube (CRT) or liquid crystal display (LCD) coupled to bus 211 for displaying information to a computer user. An alphanumeric input device 222, including alphanumeric and other keys, may also be coupled to bus 211 for communicating information and command selections to processor 212. An additional user input device is cursor control 223, such as a mouse, a trackball, stylus, or cursor direction keys, coupled to bus 211 for communicating direction information and command selections to processor 212, and for controlling cursor movement on display 211. Another device which may be coupled to bus 211 is hard copy device 224 which may be used for printing instructions, data, or other information on a medium such as paper, film, or similar types of media. Furthermore, a sound recording and playback device, such as a speaker and microphone may optionally be coupled to bus 211 for interfacing with computer system 200. Note that any or all of the components of system 200 and associated hardware may be used in a preferred embodiment, however, it can be appreciated that any type of configuration of the system may be used for various purposes as the user requires.

The present invention operates within environment of a superscalar, pipelined microprocessor 212 that speculatively executes instructions and further allows for out-of-order instruction execution. However, other microprocessors may be utilized consistent with the present invention. This processor will be explained within the following discussions.

Figure 2:
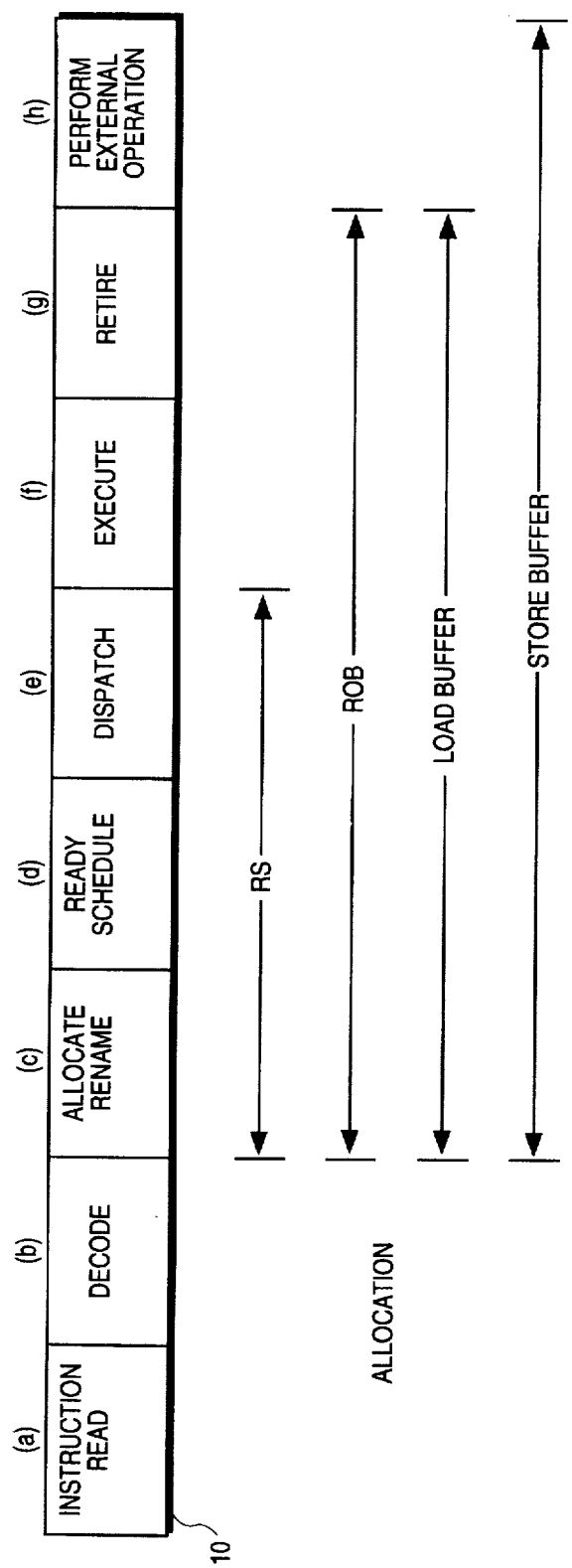
FIG. 2 illustrates an exemplary pipeline format of the present invention and allocation pipestages for the processor resources adopted by the present invention.

Refer to FIG. 2 which illustrates an exemplary and simplified pipeline format 10 of the present invention processor 212. The structure and function of the load buffer, store buffer, ROB, and RS will be explained in further discussions hereinafter. Generally, the pipestages shown in FIG. 2 are exemplary only and may individually be composed of further pipestages as apparent in other discussions herein. Aspects of the pipestage format 10 are discussed in more detail to follow, however, presented below is a summary of the overall pipeline format. The pipeline begins and a group of instructions are read at pipestage 10(a) and decoded at pipestage 10(b). At pipestage 10(c), the buffer resources (ROB, RS, load and store buffer) are allocated to the current group of instructions and register renaming occurs, also, the instructions are placed into the RS where they remain pending execution. The in-order pipeline ends at pipestage 10(c). At pipestage 10(d), some instructions within the RS that are pending execution are made ready and scheduled for execution since their source operand data is valid. At pipestage 10(e), the scheduled instructions are dispatched from the RS to appropriate execution units, where at pipestage 10(f) the instructions are executed and written back to the ROB and elsewhere. At stage pipestage 10(g), instructions of the ROB that belong to a properly predicted program path are retired and allowed to update an architecturally visible register file (RRF) or allowed to update the external bus 211. The pipeline ends at pipestage 10(g), however, at pipestage 10(h) some instructions (such as store instructions) are actually performed after retirement because they are buffered in the store buffer. A store operation is performed when it updates over the external bus at stage 10(h).

It is appreciated that a number of different pipeline formats 10 may be adopted within the scope of the present invention that may operate within a number of different types of processors. Specific levels of detail put forth herein should not be construed as a limiting factor to construing the scope of the present invention. For instance, as stated the present invention may operate within processors of the Power PC™ and DEC Alpha™ generations and is not limited to the Intel Microprocessor Architecture.

Figure 3A:
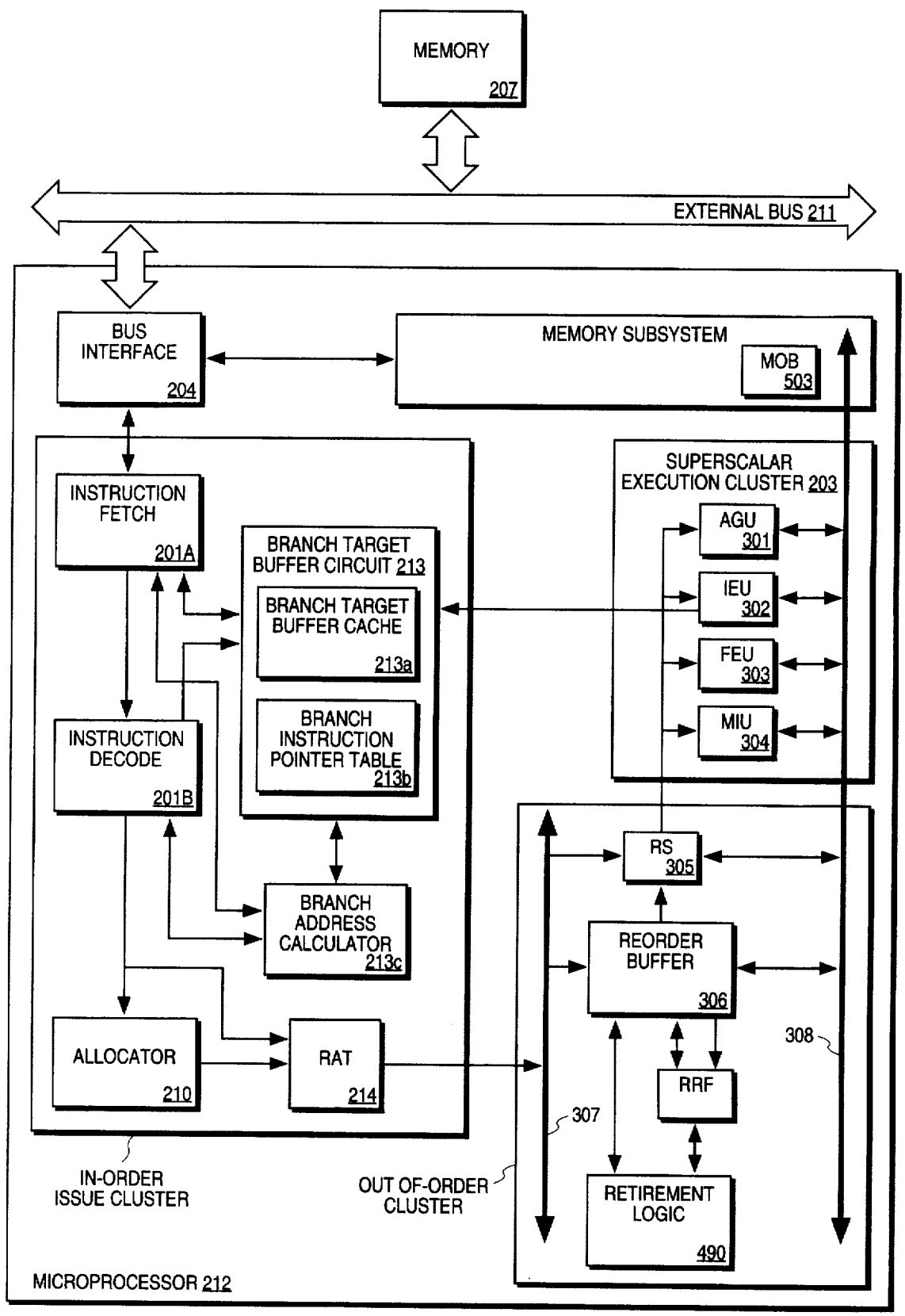
FIG. 3A is a block diagram of the general components of the present invention processor.

FIG. 3A illustrates a general block diagram of the processor 212 of the present invention. The components of the processor 212 are shown in FIG. 3A to provide the general structure and interface of the processor of the present invention. Generally, processor 212 is composed of an in-order portion and an out-of-order portion as shown. The branch target circuit 213, BTB cache 213a, branch instruction pointer 213b and the branch address calculator 213c perform speculative instruction execution by predicting program branch results to provide the pipeline with a steady source of instructions. The register alias table 214 performs register renaming and is the last stage of the in-order pipeline. Instructions flowing from the out-of order portion retire to the real register file (RRF) in program code order. The reservation station 305 and the reorder buffer 306 are illustrated. The load buffer and store buffer of the present invention are located in the memory order buffer 503. An external bus 211, a writeback bus 308 and internal bus 307 are also illustrated. The above components and the balance of the components of processor 212 are described in further detail within relevant portions of the discussion hereinafter.

Figure 3B:
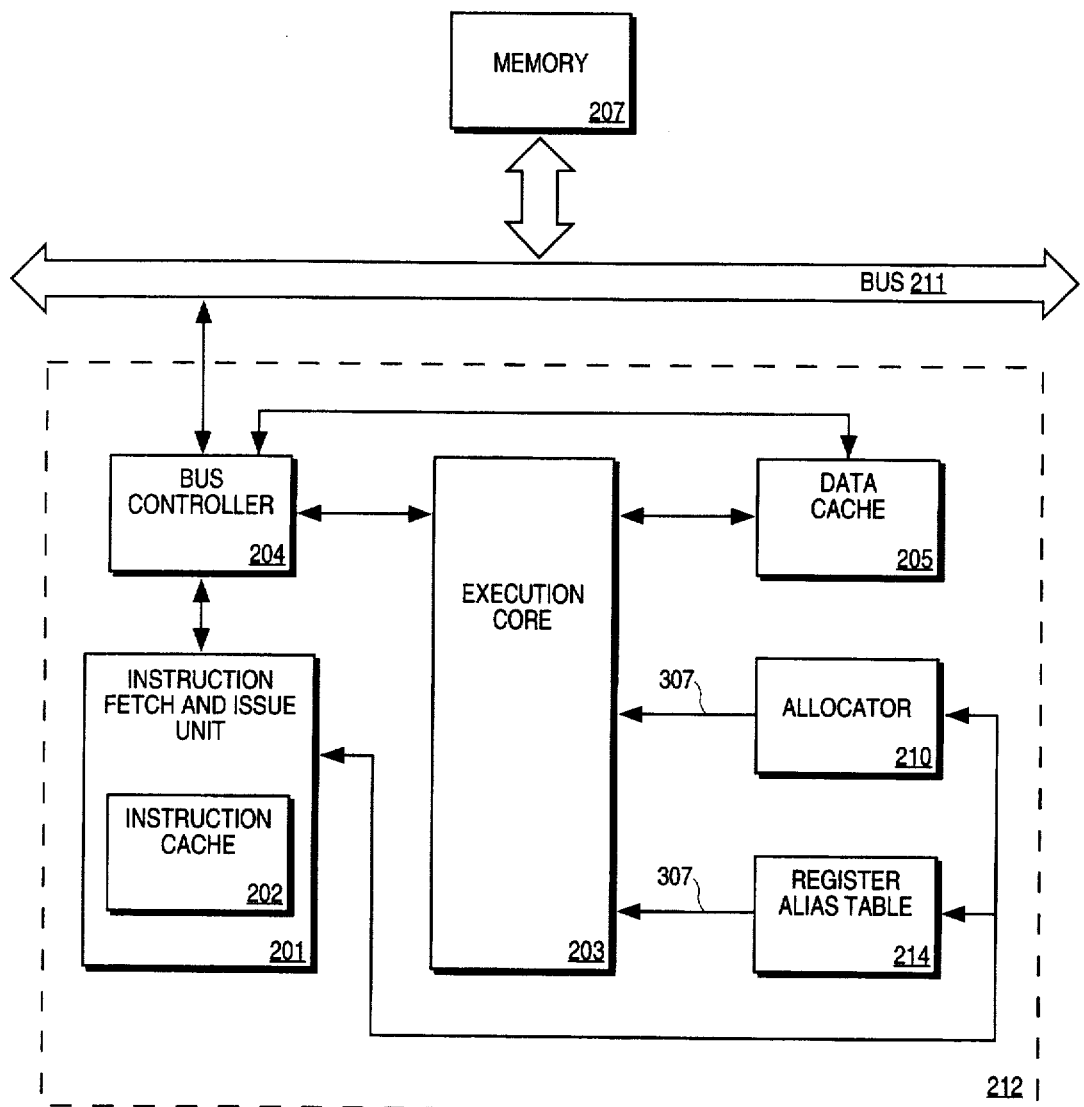
FIG. 3B is a block diagram of subsystems of the present invention processor.

FIG. 3B is a block diagram of certain aspects of the processor 212 of the present invention. The memory subsystem comprises an instruction fetch and issue unit 201 with an integrated instruction cache 202, an execution core 203, a bus controller 204, a data cache memory 205, a memory unit 207, and a bus 211. The memory unit 207 (RAM 234 and/or ROM 216) is coupled to the system bus 211. The bus controller 204 is coupled to the system bus 211. The bus controller 204 is also coupled to the data cache memory 205 and the instruction fetch and issue unit 201. The instruction fetch and issue unit 201 is also coupled to the execution core 203. The execution core 203 is also coupled to the data cache memory 205. The instruction fetch and issue unit 201 of the processor 212, the execution core 203, the bus controller 204, and the data cache memory 205, together with the other general components of FIG. 3A, comprise the processor 212. Elements 201–205 cooperate to fetch, issue, execute and save the execution results of instructions in a pipelined manner. The bus controller 204, the bus 208, and the memory 207 are also intended to represent a broad category of these elements found in most computer systems. Their functions and constitutions are well-known and are not described further.

The instruction fetch and issue unit 201 fetches instructions from an external memory, such as memory unit 207, through the bus controller 204 via bus 208, or any other external bus. The fetched instructions are stored in instruction cache 202. The bus controller 204 manages transfers of data between external components and the processor 212. In addition, it manages cache coherency transfers. The instruction fetch and issue unit 201 issues these instructions in order to the execution core 203. The execution core 203 performs arithmetic and logic operations, such functions as add, subtract, logical AND, and integer multiply, as well as memory operations. Some instructions are fetch and issued speculatively. The instruction fetch and issue unit 201 may fetch a multiple number of instructions (e.g., 1, 2, 3, or 4) within a common clock cycle. Instruction fetch and issue unit 201 is intended to represent a broad category of instruction fetching and issuing elements found in many computer systems. Their constitutions and functions are well-known and will be described only as necessary with reference to later figures.

The execution core 203 of the processor 212 includes an execution unit that holds and executes the integer and floating point instructions when their operand dependencies on execution results of preceding instructions are resolved, including those integer and floating point instructions that are speculatively fetched and issued. Similarly, the execution core 203 also includes a memory execution unit that holds, executes and dispatches load and store instructions to the data cache memory 205 (as well as external memory) as soon as their operand dependencies on execution results of preceding instructions are resolved, including those load and store instructions that are speculatively fetched and issued.

The data cache memory 206 of FIG. 3B responds to the load instructions immediately, forwarding data if necessary, whereas the store instructions are buffered. In other words, the instructions are not necessarily executed/forwarded in the order they were issued, and some instructions are speculatively executed/forwarded. However, the execution results of the integer, floating point and load instructions are buffered, and then committed to processor state in program order by the reorder buffer. The buffered store instructions are committed to processor state in program order and then executed in the "background", at the convenience of the memory system. Speculative integer, floating point and load execution results and buffer stores of mispredicted branches are purged. Note that the speculative nature of fetched, issued and executed instructions is attributed to the uncertainty of whether a particular instruction or set of instructions is to be executed due to an non-affirmed branch prediction. The execution core 203, incorporating with the teachings of the present invention, and the data cache memory 205 will be described further in detail below.

The instruction fetch and issue unit 201 of FIG. 3B transfers the stream of instructions (uops) to a register alias table (RAT) 214 and an allocator 210. In one embodiment, the instruction fetch and issue unit 201 issues up to three (or four) in-order uops during each cycle of the processor. The allocator 210 assigns each incoming uop to a location (entry) in a reorder buffer (ROB) 306, thereby mapping the logical destination address (LDST) of the uop to a corresponding physical destination address (Pdst) in the ROB. A register alias table (RAT) 214 maintains this mapping in a RAT array. By renaming the registers used by the instructions to a larger set of physical registers that reside in the ROB, false data dependencies between instructions may be removed allowing additional parallel execution of instructions. As will be discussed further below, partial width data dependencies between instructions processed by the RAT may cause stall conditions to result. As discussed above, the allocator allocates entries to the load buffer, the store buffer, the ROB and the reservation station.

The contents of a ROB register are retired to a location in a real register file (RRF) in program order. The RAT 214 thus also stores a real register file valid bit (RRFV) that indicates whether the value indicated by the logical address is to be found at the physical address in the ROB or in the RRF after retirement. Based upon this mapping, the RAT 214 also associates every logical source address to a corresponding location in the ROB or the RRF (the source operand of one instruction generally must have been the destination of a previous instruction). The structure and function of the ROB 306 will be described to follow.

Figure 4:
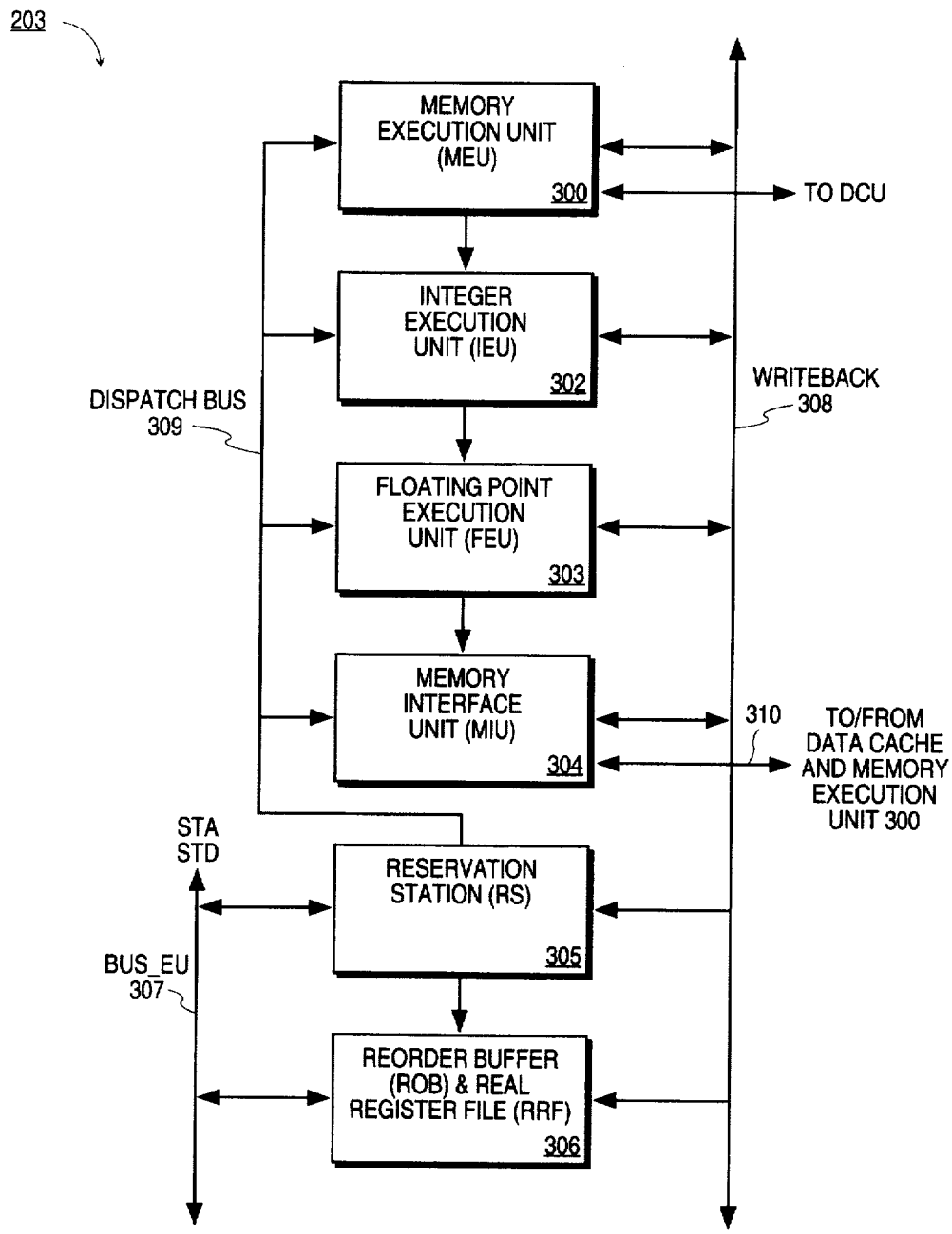
FIG. 4 is a block diagram a present invention execution unit embodiment.

FIG. 4 is a block diagram of one embodiment of the execution core of the processor 212 of the present invention. Execution core 203 comprises a reservation station (RS) 305, a memory execution unit MEU 300, an integer execution unit (IEU) 302, a floating point execution unit (FEU) 303, a memory interface unit (MIU) 304, an architecturally invisible reorder buffer (ROB) and an architecturally visible real register file (RRF) 306. Additionally, execution core 203 includes an internal bus (Bus_EU) 307 and a writeback bus 308. The MEU 300, AGU 301, IEU 302, FEU 303 and MIU 304 are all coupled to reservation station 305 via a dispatch bus 309. They are also coupled to writeback bus 308. The MIU 304 is also coupled to the data cache memory and MEU 300 via bus 310. The RS 305 is coupled to the writeback bus 308 and the Bus_EU 307. RS 305 is also coupled to ROB and RRF 306. The ROB and RRF 306 are also coupled to the Bus_EU 307 and the writeback bus 308. Together, elements 300–310 are coupled to hold, dispatch, execute and commit execution results of instructions, whereas described earlier, the dispatching and execution of instructions are not necessarily in the order the instructions are issued. That is, the instructions could be dispatched and executed out-of-order. Execution core 203 may include multiple IEUs, such as two, and multiple FEUs, such as two.

Reservation station 305 receives and stores information pertaining to the issued instructions that are pending execution and resolves their operands with data from the IEU 302, the FEU 303, the data cache memory, the ROB 306 and RRF and holds them until their operands are all resolved. The RS 305 then dispatches the issued instructions to the AGU 301, the IEU 302, the FEU 303 and the MIU 304 and the MEU 300 as appropriate. In particular, the load instruction is dispatched as a single operation, whereas the store instruction is dispatched as store address (STA) and stored data (STD) operations to the MEU 300 and MIU 304. Similar to instruction fetching, there is no requirement that the load sources or the store destinations be aligned to memory locations. In other words, the load sources of load instructions and store destinations of store instructions may span two cache lines (or two pages).

Each incoming uop is also assigned and written into an entry in the reservation station 305 by the allocator 210. The reservation station (RS) 305 of FIG. 4 assembles the instructions awaiting execution by an appropriate execution unit, such as integer execution unit 302 or memory execution unit (MEU) 300. The use of register renaming in the ROB 306 not only avoids register resource dependencies to permit out-of-order execution, but also plays a role in speculative execution since the architecturally invisible ROB contains only speculative dam. If a given instruction sequence is considered to be part of a predicted branch, then the execution of those instructions using the renamed registers in the ROB 306 has no effect on the actual registers denoted by instruction. Thus, if it is determined that the branch was mispredicted, the results calculated and stored in the ROB 306 may be erased and the pipeline flushed without affecting the actual registers found in the processor's register file (RRF). If the predicted branch affected the values in the RRF, then it would be difficult to recover from branch misprediction because it would be difficult to determine the values stored in the registers before the predicted branch was taken without the use of redundant registers in the ROB.

After execution within one of the execution units, when a result is produced, it is written to the ROB 306 at an entry that was allocated to the instruction producing the result. The result may provide an input operand to one or more waiting instructions buffered in the reservation station 305, indicating that the source operand is ready for dispatch to one or more execution units along with the instructions using the operand. In the general case, instruction information held within the reservation station will source the ROB to obtain operand data and this information is forwarded to the appropriate execution units for execution when an instruction is scheduled and dispatched. When the checking logic of the processor determines that a particular instruction is associated with a properly predicted branch, and all other conditions are satisfied, an instruction that has been executed and placed into the ROB may retire. The associated physical register (Pdst) of that retiring instruction is then written into the RRF and becomes architecturally visible according to the original program code order. ROB entries retire in order and thus the ROB is sequentially allocated. A pointer called AL_NEXT_Pdst is used by the ROB to indicate the last entry of the ROB to retire.

The MEU 300, the IEU 302, FEU 303, and the MIU 304 in turn perform their operations accordingly. The execution results of the integer, floating point and load instructions are held in the reorder buffer (ROB) 306, and then committed by RRF 306 in the order these instructions were issued. Speculative execution results of the mispredicted branches are not committed, but instead are held in the ROB 306 and deallocated upon their retirement. The ROB 306 is discussed further below.

Regarding the structure of the present invention processor 212, the following terminology describes the relevant processing stages of the instructions. The Issue stage refers to the merging of the in-order stream of instruction from the issue cluster (204, 201, 202) with the corresponding source data which is provided by the ROB 306 and then placing this information into the reservation station 305. Within the issue stage, registers used by the instruction are renamed to registers within the ROB and this renaming occurs within the RAT 214. At the Issue stage 10(a)–10(c), instructions may be part of a speculative program path as a result of a branch prediction. Also at the Issue stage, instruction information is allocated. The Ready/Schedule stage 10(d) identifies all the instructions ready to execute (Ready stage) that are pending in the RS 305 a selects (Schedules) a group (e.g., by FIFO or similar process) for execution and also schedules an execution unit (e.g., 300, 302, 303). For a given clock cycle, not all instructions that are ready are scheduled. At Dispatch 10(e), the scheduled instructions are forwarded to a selected execution (functional) unit and are executed at Execution stage, 10(f). At Writeback, the results generated by the functional units are written into appropriate entries of the ROB. Also, the writeback ports are examined for results that are sources of instructions pending in the RS 305 so that the data-ready status of these pending instructions may be updated. At Retirement 10(g), the results from the ROB that pertain to instructions that are properly predicted and also executed and placed into an architecturally visible buffer (the RRF) in their original issued order. Upon misprediction, the speculative data in the ROB is cleared.

Figure 5:
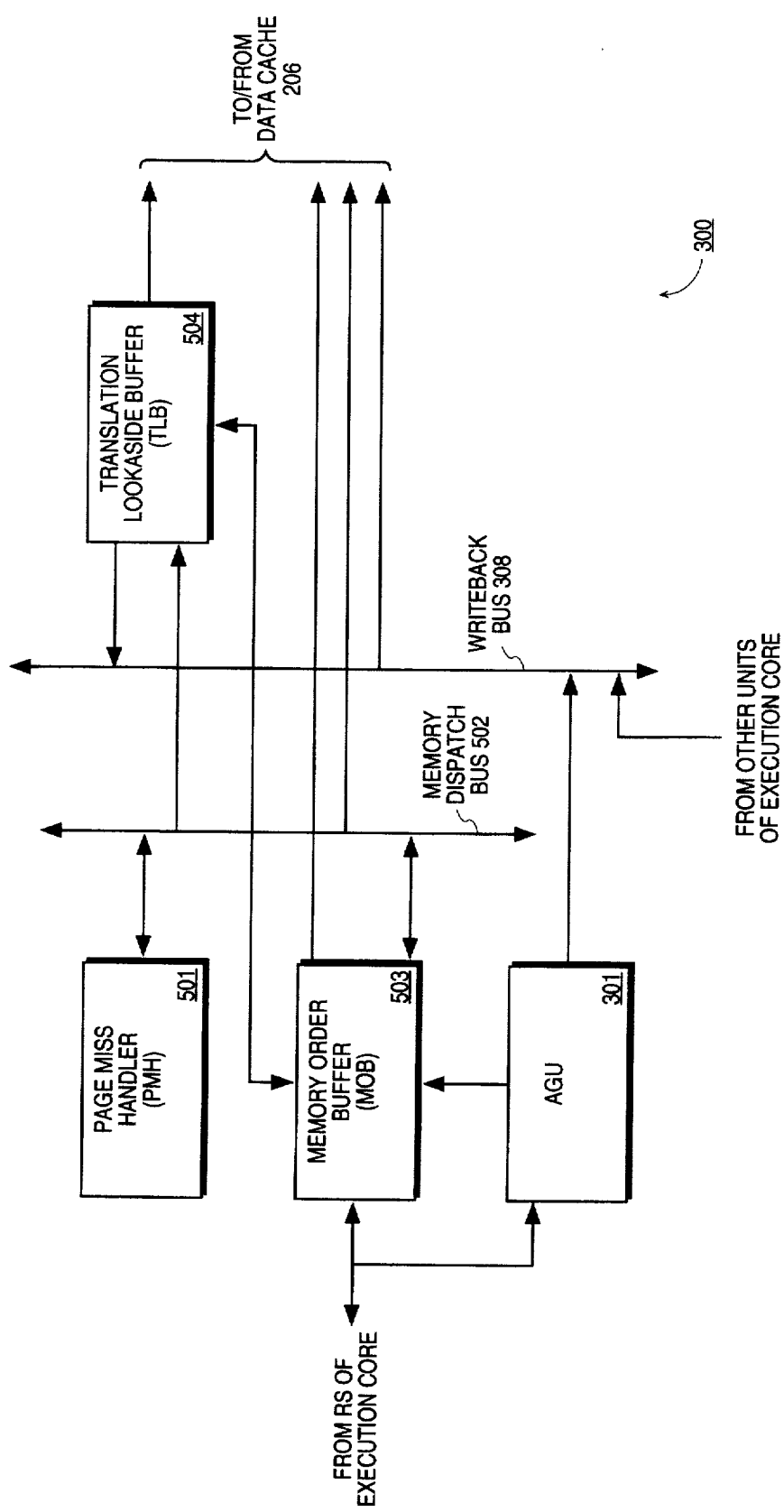
FIG. 5 is a block diagram of pertinent parts of the present invention cache controller.

FIG. 5 depicts a block diagram of the relevant portions of one embodiment of the memory execution unit (MEU) 300 of the present invention. The MEU 300 includes AGU 301, page miss handler 501, memory order buffer (MOB) 503, and translation lookaside buffer (TLB) 504, as well as memory dispatch 502 and the writeback bus 308. The PMH 501 is coupled to the memory dispatch bus 502, writeback bus 308, and TLB 504. The MOB 503 is coupled to the reservation station, memory dispatch bus 502, writeback bus 308, the data cache memory and TLB 504. TLB 504 is also coupled to memory dispatch bus 502, writeback bus 308 and the data cache memory. Memory dispatch bus 502 and writeback bus 308 are also coupled to the data cache memory. AGU 301 is coupled to MOB 503, the writeback bus 308, and the dispatch bus 309.

The AGU 301, MOB 503, PMH 501, and TLB 504 control all load accesses to the data cache memory and, in turn, the memory of the computer system. The AGU 301, MOB 503, PMH 501, and TLB 504 also execute the STA portion of the store. Specifically, MOB 503 buffers the results of the STA execution for the eventual store dispatch to the data cache memory. The AGU 301 generates the appropriate linear address for the memory operations. The AGU 301 computes the linear address using a base address, a displacement value, a scale value, an index value and a segment value. The linear address is 32-bits long with a 20 higher order bits identifying a memory page and the 12 low order bits identifying the off-set within the memory page. Reference to a linear address (LA) refers to a 32 bit address composed of a page reference high order portion and an offset lower order portion. Further, reference to a physical address (PA) refers to a 40 bit address composed of a page address high order portion and an offset lower order portion.

TLB 504 translates the 32-bit linear address into a 36-bit physical address with 24 higher order bits indicating the memory page, and forwards misses to PMH 501. In response, PMH 501 performs page walking and other well-known page miss handling functions. The MOB 503, incorporated with the teachings of the present invention, controls dispatching, buffers all store and load operations, tracks their progress as they move through execution, and then retires/commits them to permanent architectural state as appropriate. MOB 503 then causes the retired/committed stores to be executed in due course "background" at the convenience of the memory system.

Additionally, MOB 503 of FIG. 5 responds to load operations by forwarding buffered data as necessary. When an operation is dispatched and cannot complete due to some address or resource conflict, MOB 503 blocks the operation and stores the dependency information. MOB 503 redispatches block operations when the blocking source is removed. Some memory operations cannot execute speculatively, MOB 503 controls the necessary monitoring and dispatched these non-speculative operations at the correct time. For instance, MOB 503 snoops the source addresses of instructions fetched and generates a single stall signal for the bus controller to stall an instruction fetch whenever the source address instruction being fetched substantially matches any of the addresses of the store destinations of the buffered stored instructions. The TLB 504 and the PMH 501 are intended to represent a broad category of these elements found in most computer systems. MOB 503 will be described in further detail below.

Figure 6:
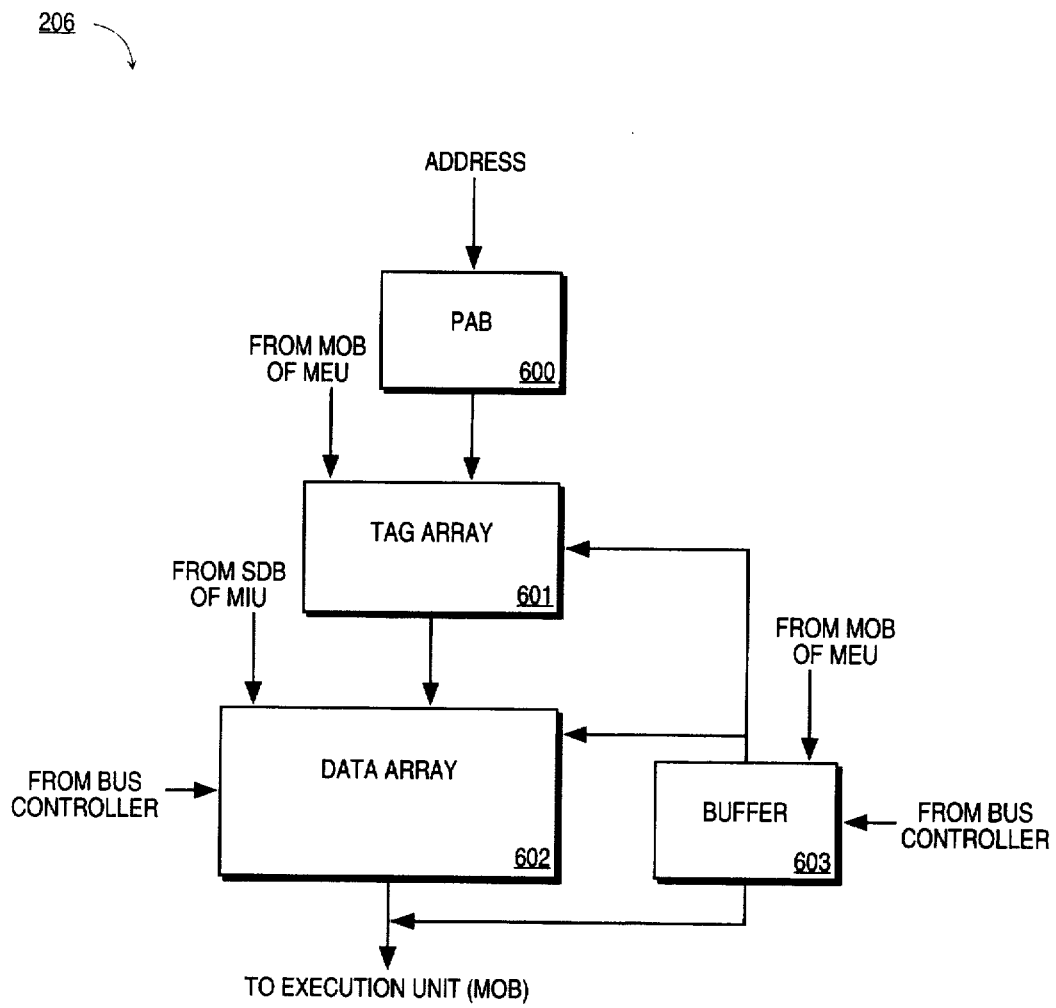
FIG. 6 is a block diagram of the pertinent parts of the present invention data cache unit.

FIG. 6 is a block diagram of one embodiment of the data cache memory of the present invention. The data cache memory 206 comprises a physical address buffer (PAB) 600, data tag array 601 and a data array 602 and queue 603. PAB 600 is coupled to receive an input (e.g., the physical address) from the TLB of the MEU and is coupled to produce physical address to tag array 601. Tag array 601 is coupled to receive an input (e.g., either store address or load address) from the MOB of the MEU. Data array 602 is coupled to receive an input from tag array 601 and the store data buffer (SDB) of the MEU, as well as being coupled to the bus controller. In response, data array 602 produces an output to the execution core. Queue 603 is also coupled to tag array 601 and data array 602. Queue 603 is also coupled to receive an input from the MOB as well as the bus controller. In response, data array 602 produces an output to the execution core.

The PAB 600 receives and saves the 24 high order bits of the translated physical addresses from the TLB of the MEU for the store and load operations, and in cooperation with the MOB and MIU, commits them to processor state and executes them as appropriate. Data tag array 601 stores the physical address tags of the data currently being cached in data array 602 and tag matches the accessing physical addresses against the stored physical address tags. Data array 602 receives and stores the data currently being cached and responds to data loads. Data tag array 601 and data array 602 have sufficient capacity for storing 128 sets of 2-way set associative 32-byte cache lines of data and their corresponding address tags. PAB 600, in cooperation with the MOB of the data cache controller, will be discussed in further detail below. TAG array 601 and data array 602 are intended to represent a broad category of these elements found in most computer systems, whose functions and constitutions are well-known and will not be further described.

Queue 603 contains accesses to data cache memory 206 that miss the cache memory and are currently pending on the bus. The entries in queue 603 are also checked where the data cache memory is accessed to determine if the desired data is stored in one of its entries or there is a request for that cache line currently pending on the bus. Queue 603 includes storage locations for temporarily storing the data returned for those pending operations. Queue 603 supplies the data and its tag information to data array 602 and tag array 601 respectively. The queue 603 includes four entries having a 256 bit width (one cache line).

Figure 7:
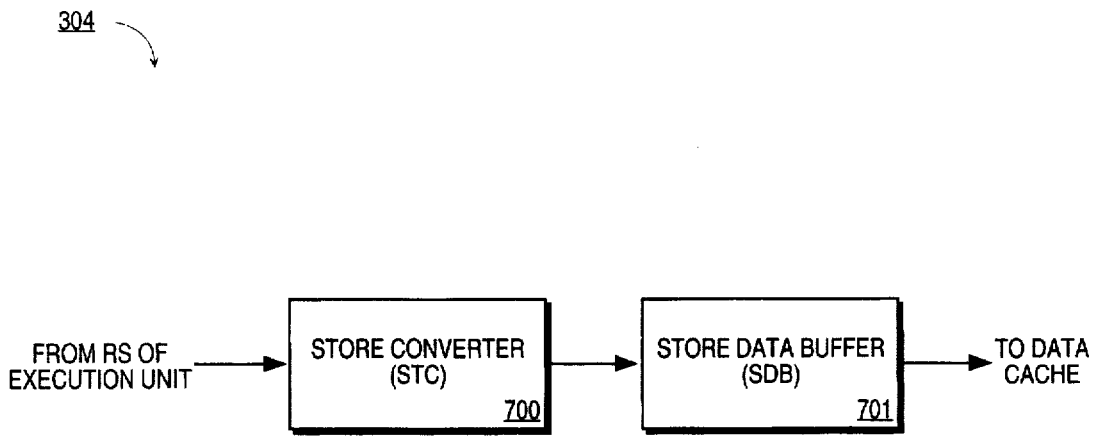
FIG. 7 is a block diagram of the relevant parts of present invention memory interface.

FIG. 7 is a block diagram of one embodiment of the relevant portions of the MIU 304 of the execution unit of the present invention. The MIU 304 comprises a store converter (STC) 700 and a store data buffer (SDB) 701, coupled to each other, such that store converter 700 receives data from the reservation station of the execution unit and sends data to SDB 701. SDB 701 then sends the data onto the data cache memory.

The STC 700 converts the floating point data of the STD operations. The SDB 701 receives and stores the STD operations and in cooperation with the store address buffer (SAB) of the MEU, and the PAB of the data cache, commits the STD operations as appropriate, and causes them to be dispatched (with their corresponding STA operations) to memory. The SDB 701 includes 12 entries, each for storing a single STD operation. Each entry is capable of storing 64 bits of data. Each entry in the SDB corresponds to an entry in the SAB and the PAB. There is a one-to-one correspondence between the entries. The STA and STD operations are assigned entries when issued. The assignment is in the form of an ID, referred to as the store buffer ID (SBID). The functions and constitutions of the STC 700 are well-known and will not be further described. SDB 701 and its cooperation with the SAB and PAB, will be described in further detail below.

Figure 8:
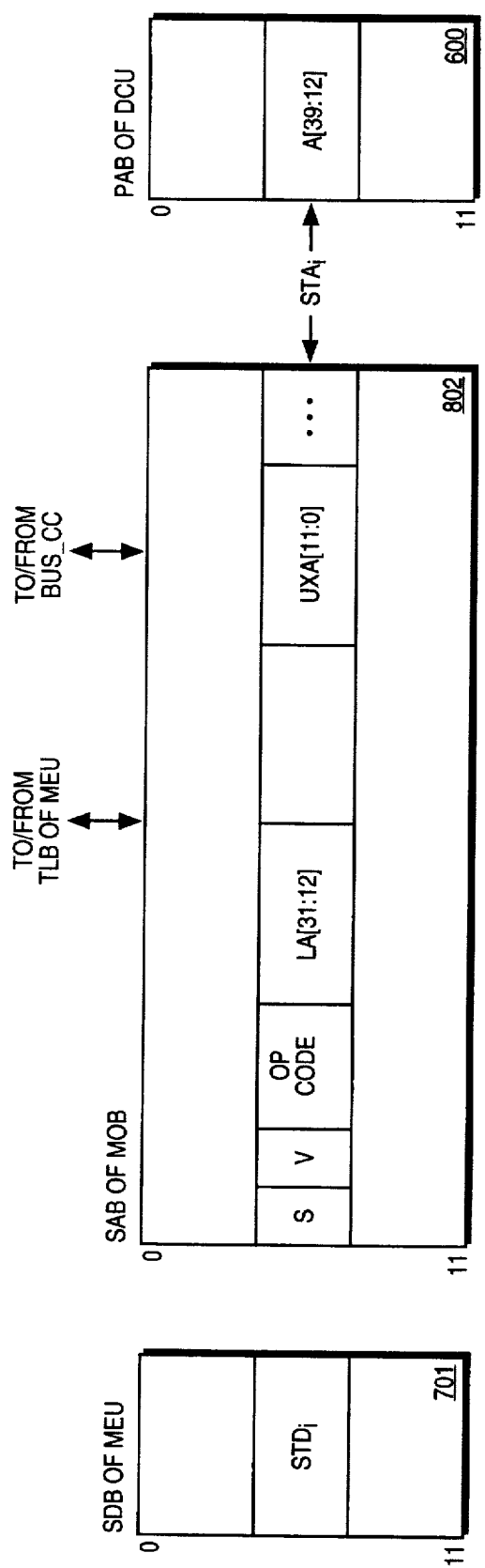
FIG. 8 is a block diagram depicting the interaction between the store address buffer the store data buffer and the physical address buffer of the present invention.

FIG. 8 is a block diagram of one embodiment of the PAB, the SDB and the SAB. The SAB 802 is coupled to the TLB of the MEU and Bus_CC. The PAB 600, the SDB 701 and SAB 802 all comprise an equal number of buffer slots. In one embodiment, up to a maximum of 12 buffer slots are included. The STD and STA operations of the store instructions are stored in corresponding buffer slots of the PAB 600, SDB 701 and SAB 802. More specifically, the 24 high order bits of the physical address (PA [36:12]) are stored in the buffer slot in the PAB 600. The STD operation is stored in a corresponding buffer slot and the SDB 701. The STA operation, including the valid bit, the OP code, the 20 high order bits of the linear address (LA [31:12]), and the 12 page offset designating bits of the address (UXA[11:0]), is stored in a corresponding buffer slot in the SAB 802. Additionally, the 8 lower order bits of a page designated portion of the physical address (PA[19:12]) of the STA operation are replicated in the buffer slot in the SAB 802. The STD and STA operations of most store operations are promoted to a "senior" state, i.e. ready for retirement or commitment, in due course, when their respective preceding instructions have been retired/committed or promoted to the "senior" state. The "senior" STD and STA operations are then executed (e.g., performed) in the "background" in due course when the data cache is free and then purged from the SDB 701, the SAB 802 and the PAB 600. The STD and STA operations of some of the store instructions, such as those storing data to memory locations mapped to I/O devices, are not eligible to be promoted to the "senior" state. The store data and store operations of these store instructions are retired/committed, and purged from the SDB 701, the SAB 802 and the PAB 600 concurrent with their executions. In other words, when the target I/O devices are ready to accept the data being "stored", then the execution occurs. The linear addresses are driven from the SAB 802 to the TLB again, and the newly generated PA is directly provided to the tag array of the data cache, bypassing the PAB of the data cache memory. Additionally, if a store instruction involves storing data to memory locations spanning two cache lines, the data cache controller signals the data cache memory, and the STD and STA operations are driven to the data cache memory twice, with the data size and the physical address being adjusted accordingly the second time.

Figure 9:
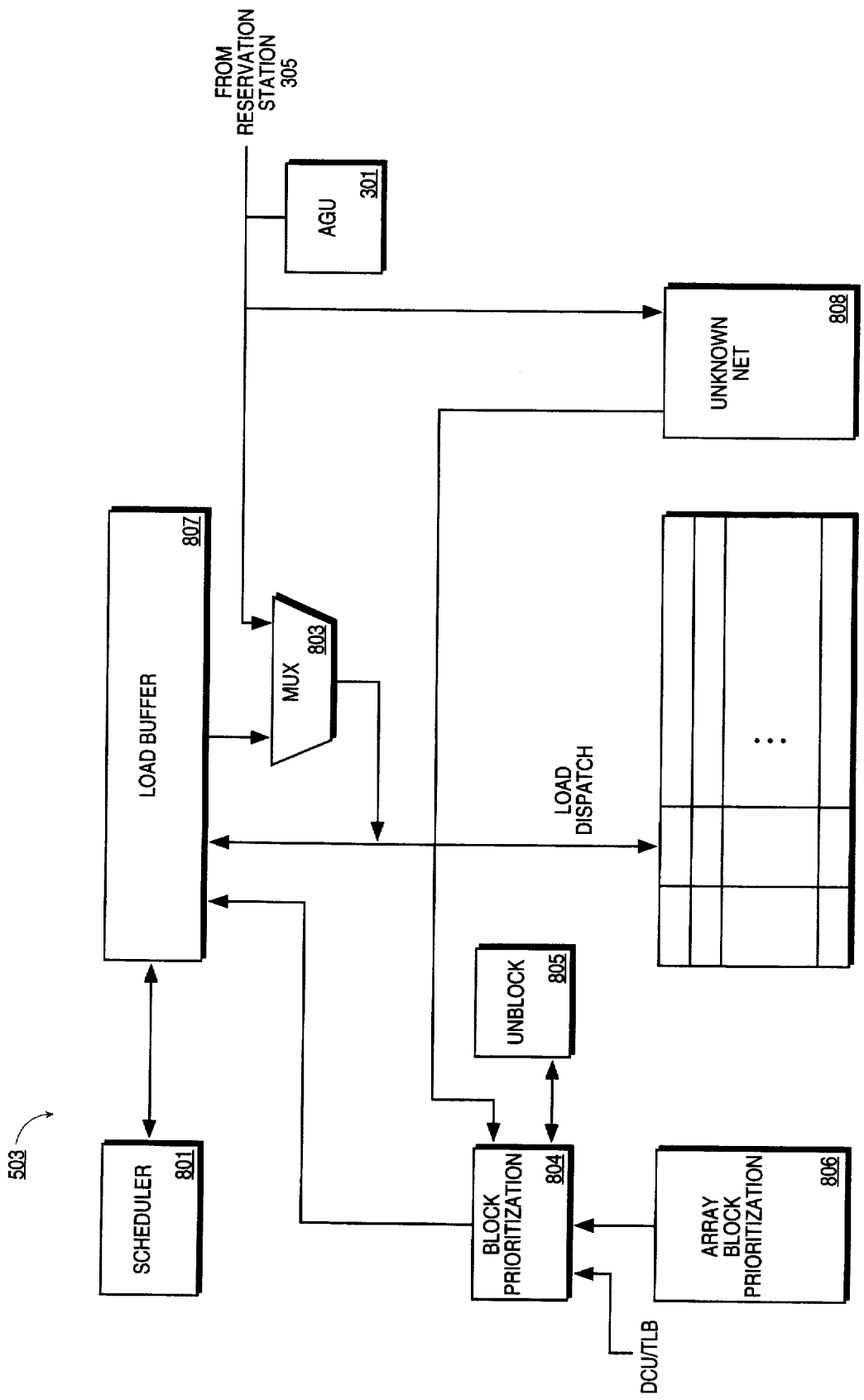
FIG. 9 is a block diagram of the relevant portions of the memory order system of the present invention.

FIG. 9 is a block diagram of one embodiment of the relevant portions of the memory order buffer (MOB 503). The MOB comprises scheduler 801, load buffer (LB) 807, multiplexer (MUX) 803, block prioritization logic 804, unconditional block 805, array block prioritization 806, store buffer 802, and unknown net block 808. Scheduler 801 is coupled to load buffer 807. Load buffer 807 is coupled to block prioritization 804, store buffer 802 and MUX 803. Block prioritization logic 804 is also coupled to receive an input from the TLB and the data cache memory, unknown net 808, array block prioritization 806 and unconditional block 805. Unknown net 808 and MUX 803 are also coupled to the reservation station via the dispatch bus.

The SAB 802 stores the remaining operands and partial replications of the page denoting portions of the store destination addresses of buffered STA operations. The SAB 802, in cooperation with the SDB of the MIU and the PAB of the data cache memory, retires/commits the STA operations as appropriate, and causes them to be dispatched. LB 807 also is coupled to receive a copy of the load operations dispatched form the RS via MUX 803. Load operations are copied into LB 803. LB 803 provides the stored load operations to the TLB and the execution pipe upon dispatch. MUX 803 receives loads from load buffer 807 and from the dispatch bus and outputs one for dispatch to memory.

Unknown net 808, unconditional block 805 and array block prioritization 806 determine if a specific set of condition exist that would cause or require a particular load operation to be prevented from executing. Each of these will be described below later. Block prioritization logic 804 receives conflicts/conditions/identification signals to block load and initiate operations stored in LB 807. Block prioritization logic indicates the status of load operations through signals sent to LB 807. Scheduler 801 schedules load operations for dispatch to memory based on their status.

Figure 10:
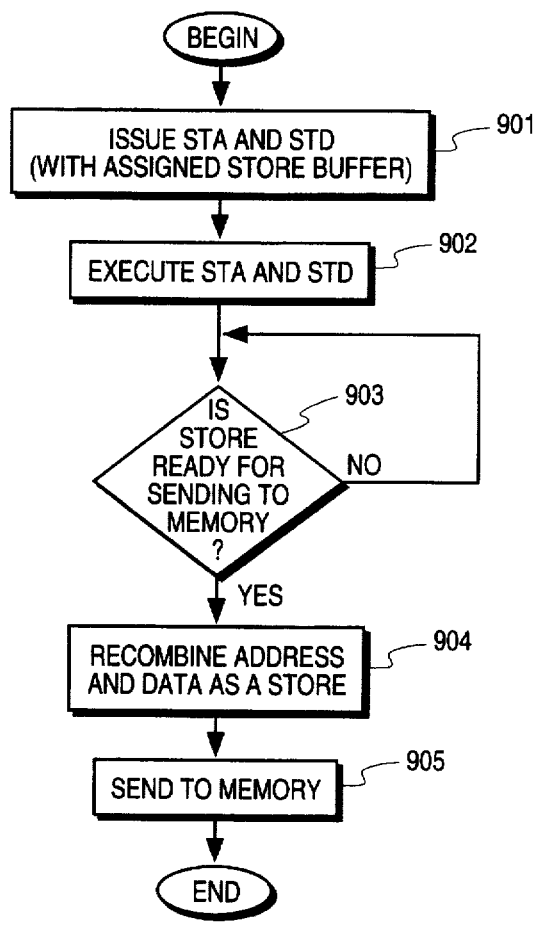
FIG. 10 is a flow chart depicting the process of the present invention for performing store operations.

The Store Buffer. The process for performing store operations is shown in FIG. 10. Each store operation is received and executed by a processor and the store operation is received as a store instruction. In response to receiving a store instruction, a store data (STD) and store address (STA) instructions are issued (processing block 901). Store buffer entries are allocated by the allocator 210 during the allocation pipestage 10(c). The STD and STA instructions are then executed independently and possibly in parallel, depending on the availability of resources (processing block 902). A determination is then made as to whether the store is ready to send to memory (processing block 903). Once it is determined that the store is ready to be sent to memory over the external bus 211 (e.g., ready to be committed to an architecturally visible processor state), the address and data results from the execution of the STA and STD instructions respectively, are recombined as a single store operation (processing block 904). Once the store has been recombined, the store is sent to memory for completion (processing block 905). It is appreciated that a store may be sent to memory over the external bus after retirement. A store is not deallocated from the store buffer until it is sent to memory (e.g., performed).

The processor 212 receives a stream of instructions and initially generates a sequence of micro-instructions, including the STA and STD micro-instructions. The stream of instructions is usually received by the processor in response to an instruction fetch initiated by the processor. The micro-instructions are generated by a decoder in the instruction fetch and issue unit. The micro-instructions are issued in order as the processor reads the instruction. The STA and STD micro-instructions are then issued to the execution core of the processor for execution. Because of the multiple buffer entries for the SDB, SAB and PAB, if multiple AGUs and multiple execution units are within the execution core, then the execution core of the present invention may execute multiple STA/STD pairs at the same time in parallel. Furthermore, STA/STD pairs may execute out-of-order where there are no conflicts or dependencies between the store operations.

The Load Buffer. The process and mechanism for performing load operations is now discussed. Load operations are performed in response to load instructions executed in the computer system 200. The load instructions are received and executed by a processor in the computer system. In performing the load operations, the present invention insures that there are no memory ordering violations, even though these operations may be performed out-of-order. Resources (entries) of the load buffer are deallocated at retirement.

Figure 11:
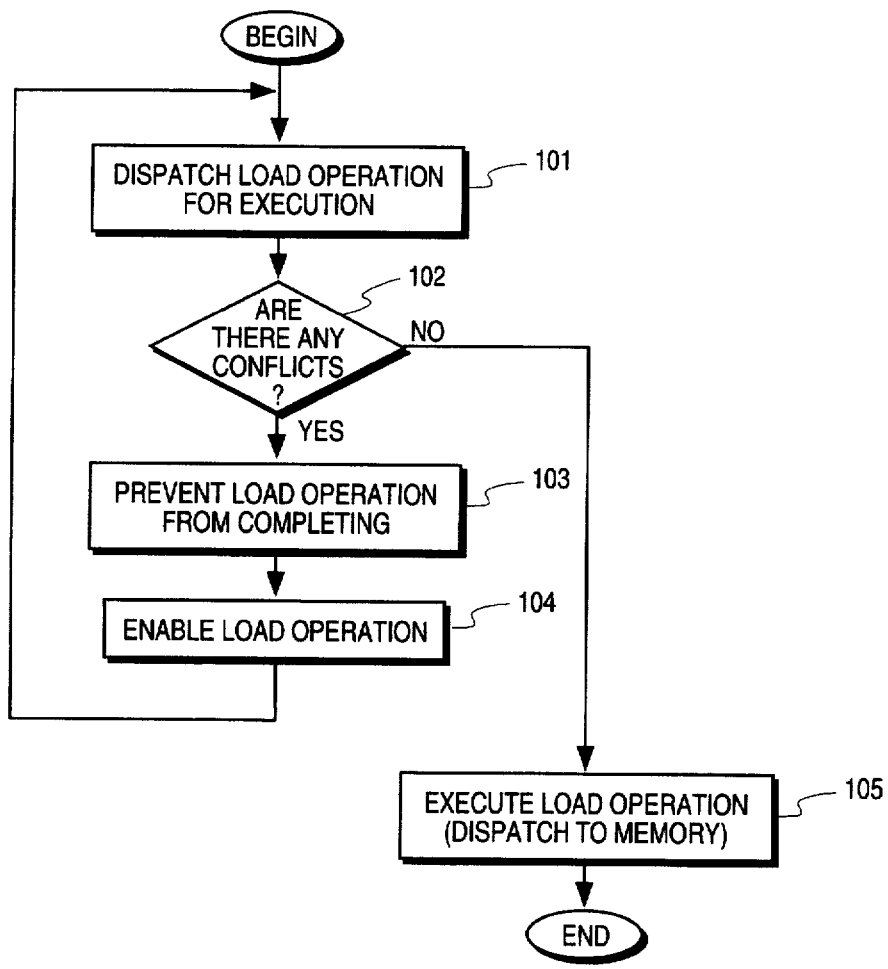
FIG. 11 is a flow diagram illustrating the present invention load instruction process.

The process for performing a load operation in the present invention is depicted in the flow diagram of FIG. 11. The load operation is allocated to the load buffer 807 and is initially dispatched (at pipestage 10(e) of FIG. 2) from the reservation station 305 and into the memory subsystem for execution over the computer system (processing block 101). This dispatch occurs when there are no data dependencies on the load. A test then determines whether there are any conflicts (other than data depending conflicts) that might exist between the load operation and previously dispatched store operations which could possibly result in incorrect data being loaded into the processor as a result of the execution of the load (processing block 102). Several mechanisms are provided for detecting when conflicts arise, such that speculative execution may be used as much as possible. These conflicts may be due to address dependencies where the source address of the load operation may be the same as a destination address of one of the currently dispatched, yet not completed, store operations. Address dependencies are tracked between load and store operations by assigning an identification to each load operation to identify its relative temporal position with respect to the sequential stream of store operations. Using the identification, the a set of store operations is identified, if any, that potentially conflict with the load operation. The present invention also identifies conflicts due to resource dependencies. Resource dependencies exist when a resource required for execution of the load operation is currently in use or unavailable for one of a number of reasons, such that the load operation cannot gain control of the resource for its execution.

If the present invention identifies either such a conflict or condition (e.g., a resource or address dependency), then processing continues at processing block 103, where the load is temporarily prevented, or "blocked", from completion for a predetermined period of time (e.g., the current cycle). The load operation is enabled, or "awakened" when the conditions or conflicts that resulted in the block are no longer in existence (processing block 104) and processing continues at processing block 101 when the process is repeated. If the present invention does not identify any conflicts, then processing also continues at processing block 105. At processing block 105, the load operation is dispatched to memory to retrieve the desired data (e.g., the load operation is performed within the computer system). At retirement of the load instruction, the load buffer deallocates the entry assigned to the retired load instruction.

The present invention also provides a process for performing load operations wherein multiple requests for the same cache line are satisfied with the first of such requests being sent to memory while the other requests receive their desired data upon its return in response to the performance of the first operation.

The Reorder Buffer. The reorder buffer (ROB) 306 is a fundamental component in three aspects of the processor of the present invention: speculative execution, register renaming, and out-of-order execution. The ROB 306 provides the extra storage for physical registers that permits register renaming which permit more parallelism in executing instructions. The ROB 306 stores instructions that are speculatively executed to provide a storage buffer prior to committing the results to the architectural state of the processor. The ROB 306 provides a storage buffer to permit reordering of the machine state, in the original program order, from out-of-order operations. The ROB 306 detects exceptions and mispredictions, thereby subsequently initiating repair to retain the proper machine state.

Figure 12:
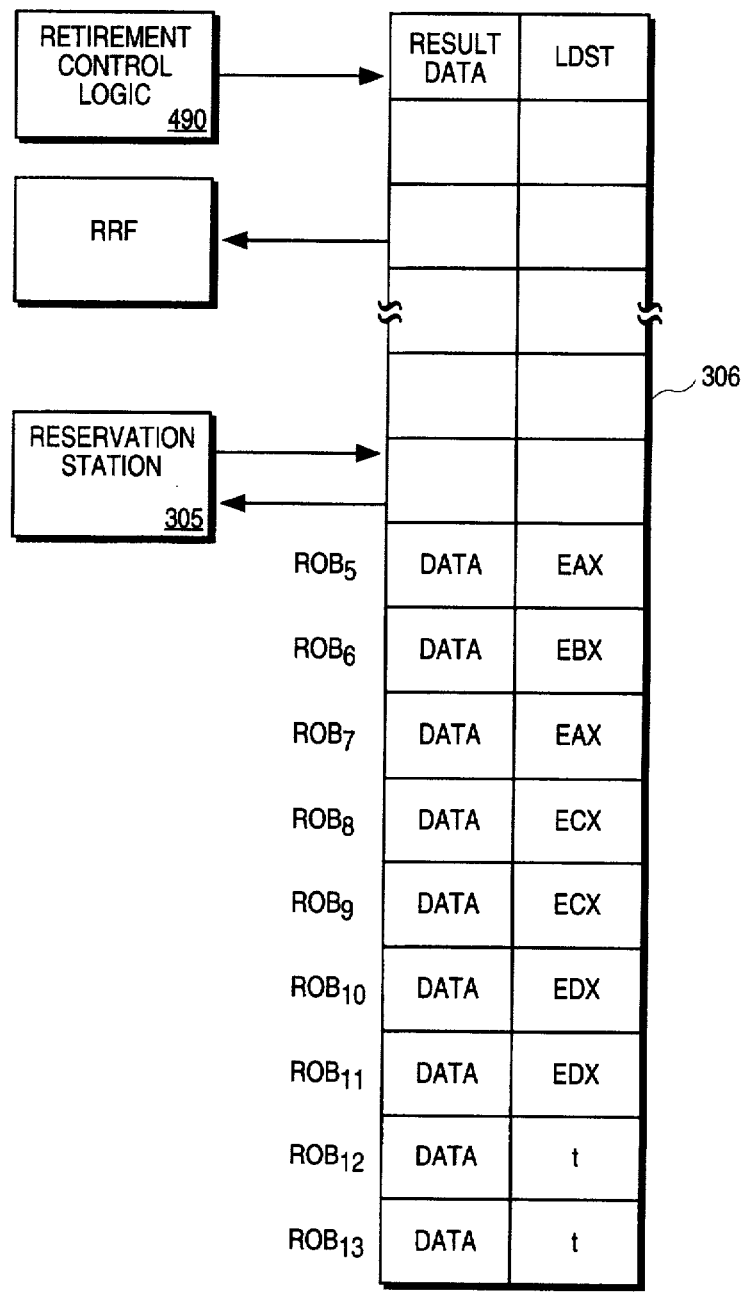
FIG. 12 illustrates a table in the reorder buffer of the present invention.

FIG. 12 illustrates an example ROB array. As shown, physical registers (right side) are paired up with assigned logical register entries (LDST). The assignment of logical registers to physical registers is performed by the RAT 214. The ROB 306 supports speculative execution by buffering the results from the execution units before committing architecturally visible state of the writeback data in the RRF. Consequently, instructions are fetched and executed at a maximum rate by assuming branches are properly predicted and no exceptions occur. If a branch is mispredicted, or if an exception occurs in executing a instruction, the processor can recover simply by discarding the speculative result stored in the ROB 306. In this case, the processor restarts processing at the proper instruction by examining the committed architectural state in the RRF. A key function of the ROB 306 is retirement or completion of instructions. The process of committing speculative state to architectural state is termed retirement. The ROB 306 supports out-of-order execution by allowing execution units to complete instruction execution and writeback data results without regard to other instructions that are executing simultaneously. Therefore, as far as the execution units are concerned, instructions complete out-of-order. The retirement control logic in the ROB 306 subsequently reorders the completed instructions into the original sequence issued by the ID 201 as it updates the architectural state in the RRF.

The buffer storage for executed results is also used to support register renaming. Register renaming allocates a new physical register as the destination of every operation which writes to an architectural register. The renaming process is hardware managed and is invisible externally. The execution units write result data only into the renamed register in the ROB. The retirement logic in the ROB updates the architectural registers (RRF) based upon the contents of each renamed instance of the architectural registers. Instructions which source an architectural register obtain either the contents of the actual architectural register or the contents of the renamed register. Since processor 212 is superscalar, different operations in a clock which use the same architectural register may in fact access different physical registers.

Figure 13:
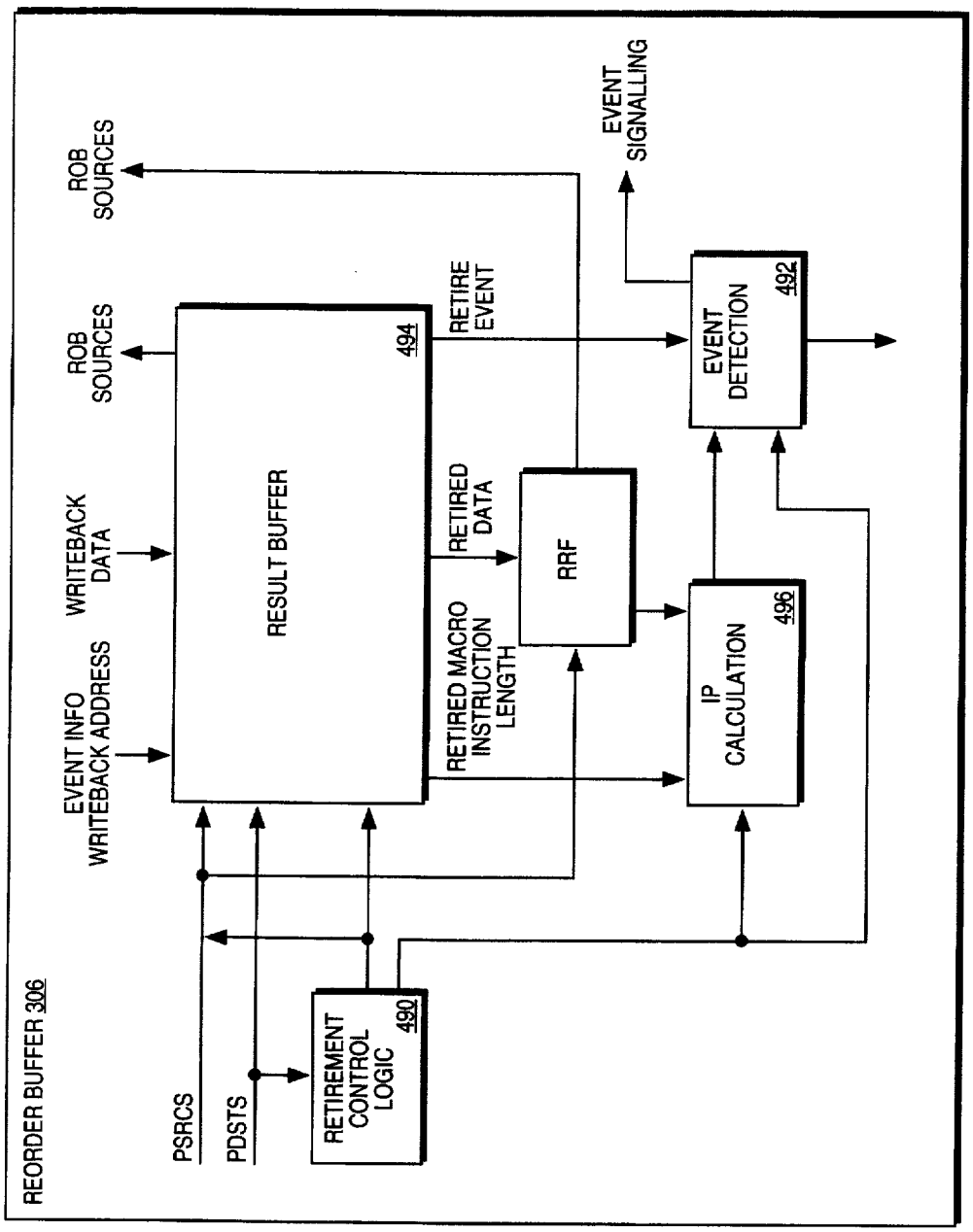
FIG. 13 illustrates the reorder buffer (ROB) of the present invention.

FIG. 13 illustrates a block diagram of the ROB 306 configured in accordance with one embodiment of the present invention. As shown in FIG. 13, in addition to the RRF, the ROB 306 contains four internal functional blocks: result buffer 494, retirement control logic 494, IP calculation 496, and event detection 492. In one embodiment, the buffer storage 494 contains 40 entries. The retirement control logic 490 generates addresses for retirement reads performed in each clock cycle. In general, the retirement control logic 490 computes retirement valid signals indicating which entries with valid writeback data are ready for retirement. The IP calculation 496 generates the architectural instruction pointer as well as several other macro and microinstruction pointers. The instruction pointer is generated based on the lengths of all the instructions that retire, as well as any branch target addresses. Each entry stored in the ROB 306 contains control information, a validity bit, data, that indicates whether or not the instruction result is valid, and corresponding the logical destination (Ldst). Each entry in the ROB 306 also contains fields for a instruction result (Pdst), a set of flags, a mask for the flags, a code that indicates what the results mean, and fault data.

The event detection 492 determines whether the execution unit, processing the corresponding instruction, reported an event. If an event is reported, the ROB 306 entries following the entry reporting the event are discarded. In addition, processor circuitry is signaled to jump to a particular microcode handler, and most of the state of the entry with an event is saved for micro-code handling use. The signaling of an event is based on the events reported to the ROB 306 by the execution units in the execution cluster 203. The event detection block 492 saves all states from the corresponding ROB entry needed by the micro-code event handler. The event detection 492 also generates several events in addition to the events reported by the execution cluster 203. For example, when the ROB 306 determines that a wrong path is taken based on a prediction of a branch instruction, any operations in the wrong path are not allowed to retire. In this case, the event detection 492 causes flushing of the speculative state from the processor, and a micro-code jump to an event handler. Also, when the ROB 306 retires an operation that faults, the in order and out-of-order circuitry of the processor is cleared.

The ROB 306 is active in both the in-order and out-of-order portions of the processor. During the allocation pipestage, entries in the ROB 306 that hold the result of the speculative instructions are allocated. In addition, addresses of the ROB entries (Pdsts) for the instructions are also written to the RS 305. In the pipestage immediately following entry allocation in the ROB 306, the source data corresponding to the instructions are read from the ROB. The source addresses are provided by the RAT 214 based on the alias table update. The RAT writes the addresses of the ROB entries sourced with each instruction into the RS.

After execution, the execution unit performs the appropriate function, and the corresponding execution unit writes back destination data into the ROB during Writeback. The writeback pipestage is decoupled from the register rename and register read pipestages because the instructions are issued out-of-order from the RS 305. During the Retirement pipestage, the retirement control logic 490 reads candidates for retirement. Instructions ready for retirement are calculated and the event detection 492 detects any events, and the IP calculation 496 calculates the current instruction pointer. The retirement pipestages are decoupled from writeback pipestages, because the writebacks are out-of-order with respect to the original program. During retirement, the architectural state is updated by transferring retired ROB entries to the RRF.

Figure 14:
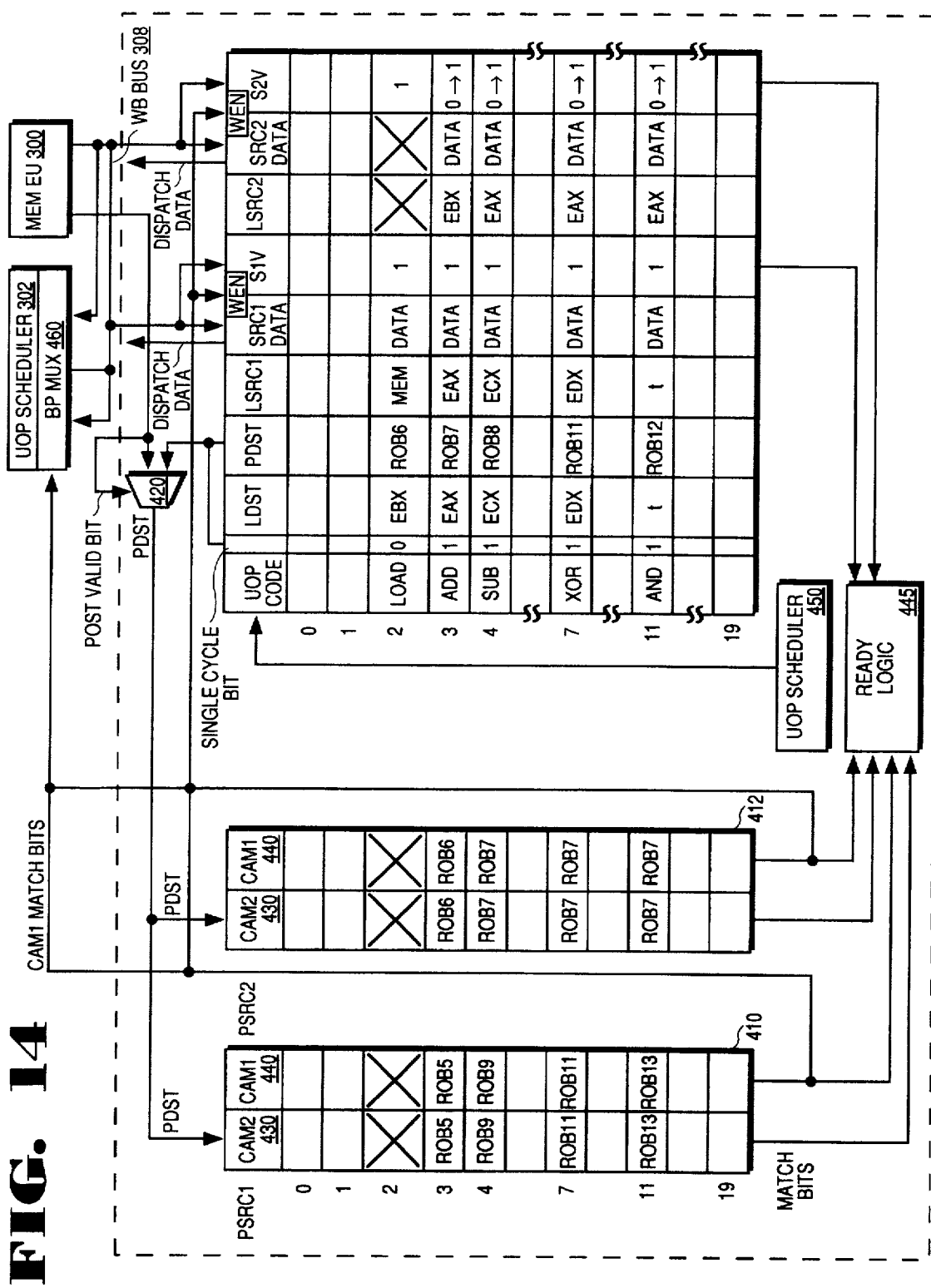
FIG. 14 is an illustration of the reservation station (RS) of the present invention.

The Reservation Station. The reservation station 305 is illustrated in FIG. 14 and filled with sample instruction information. The RS buffer contains 20 entries and each entry contains a field for the uop code, the logical destination register (of the instruction set of the processor) LDST, a physical destination register assigned to the uop (PDST), the logical source1 register and data, the logical source2 register and data and two source valid bits S1V and S2V. When the source operands associated with the uop are available for use by the reservation station then the source valid bits will indicate. The ready logic 445 determines which uops of the RS have both source operands valid and indicates these entries are ready. Of these instructions, the scheduler 450 will schedule an appropriate number of ready instructions to execute over a given execution unit.

The pipestages of the RS are as follows: Ready, Schedule, Dispatch, Bypass. At the ready stage, the ready logic 445 determines which entries of the buffer are ready. At schedule, the scheduler 450 determines which of the ready instructions will execute over a selected and scheduled execution unit. At dispatch, the uop information of the scheduled entries am forwarded to the scheduled execution for execution. At bypass, information returning from an executed instruction may be bypassed and included within the information of the currently dispatched instruction. This is performed in order to maintain one cycle throughput for instructions that take only one cycle to execute. The CAM matching circuits 430 and 440 are used by the RS in part for scheduling instructions and they are not particularly pertinent to the operation of the present invention.

It is appreciated that once dispatched, the entry is invalid and deallocated by the RS 305. Since entries may be dispatched at any time, deallocation is not performed sequentially and therefore allocation to the RS 305 is not sequential. The RS 305 maintains a vector list DEALLVECTOR indicating which entries (if any) were deallocated, e.g., dispatched, for any given cycle. This information is supplied to the allocator unit 210. For instance, if entry 2 entry 4 and entry 11 are dispatched in a given cycle, then the reservation station informs the allocator unit that entries 2, 4, and 11 have been deallocated. The vector then be a string of 20 bits with entries 2, 4, and 11 set and the remainder reset. However, them are a number of well known methods to generate the deallocation vector information from the RS that are within the present invention and the above is but one example within the scope of the present invention.

PART III—ALLOCATOR

Figure 15:
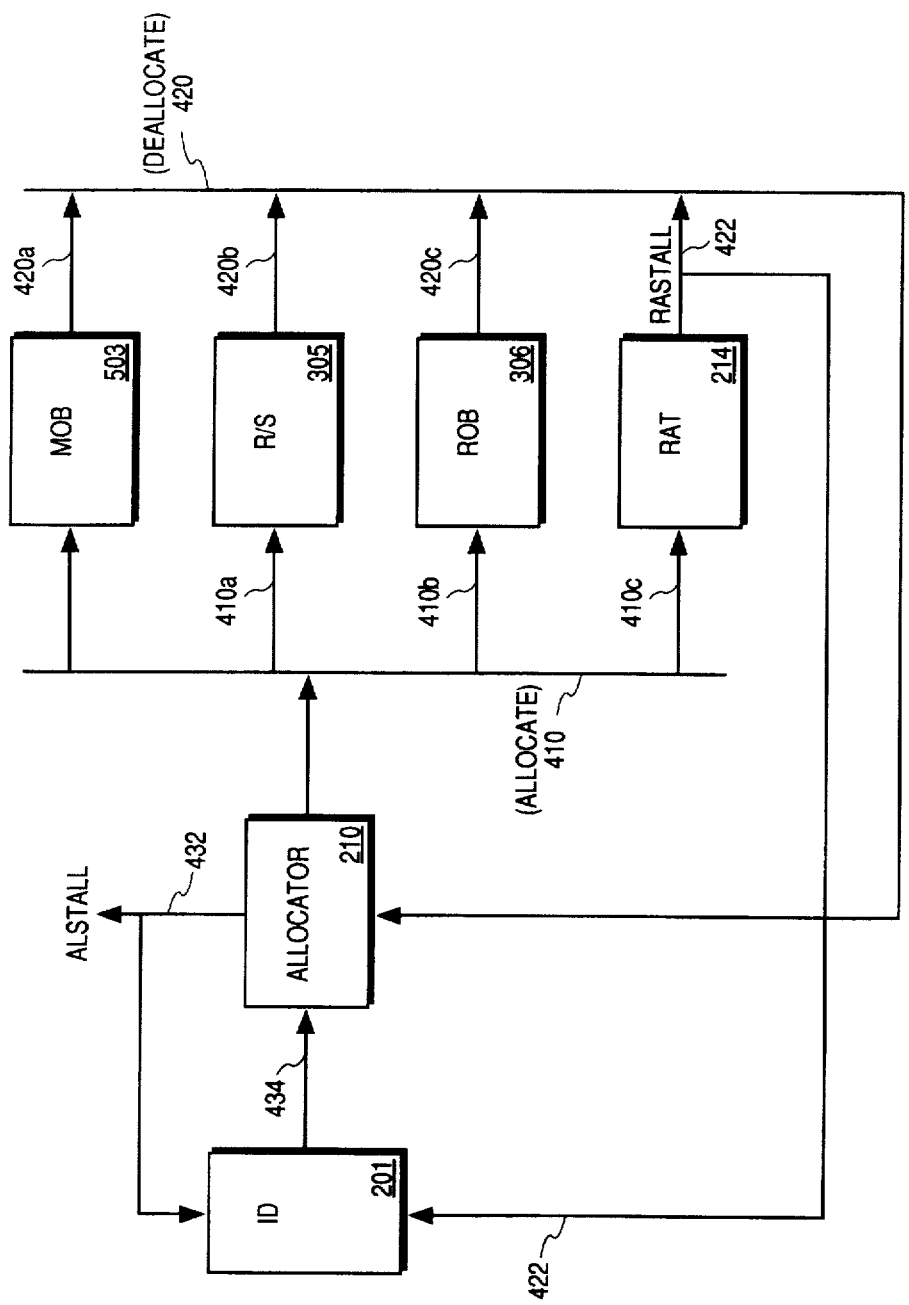
FIG. 15 illustrates the interface between the allocator of the present invention and the buffer resources.

Allocator Interface. The allocator interface between the pertinent components of the present invention is illustrated in FIG. 15. The allocator 210 is coupled to an allocation bus 410 which carries the current allocated entry designations and write enable vectors for the buffer resources. Address of allocated Pdsts are carried over bus 410b to the ROB 306. These Pdsts are also supplied to the RAT 214 over bus 410c. Bus 410b also carries the value of the AL_NEXT_Pdst pointer value from the allocator to the ROB. Allocated reservation station entries are carried over bus 410a to the RS 305. Also supplied to the RS 305 are the allocated entries for the load and store buffers. These are placed into the entries of the RS corresponding to the appropriate load and store instructions and are transferred to the MOB 503 at a later stage of processing. The MOB 503 contains both the load and store buffers. During each clock cycle, the allocator attempts to allocate a ROB entry to each instruction and a RS entry to each instruction (except for FXCH operations). A load buffer entry is allocated for each load instruction and a store buffer entry is allocated for each store instruction for each clock cycle.

As shown in FIG. 15, a deallocation bus 420 is shown. Bus 420 carries information regarding the deallocation of entries of the resource buffers to the allocator 210 so that the allocator is informed of resource availability. A tail pointer from the load buffer and a tail pointer from the store buffer are sent over bus 420a to the allocator 210. The tail pointers indicate the last valid entries of the circular load and store buffers and are updated as entries become deallocated (sequentially) from each. The tail pointer of the load buffer is updated at retirement of the load instructions. The tail pointer of the store buffer is updated when stores are performed over the external bus 211. Similarly, the ROB forwards a tail pointer over bus 420c to the allocator 210. This tail pointer indicates the last valid entry of the ROB and is updated (sequentially) as ROB entries retire to the RRF. The tail pointer of the ROB is updated as instructions retire. Lastly, the reservation station forwards a DEALLVECTOR over bus 420b representing those entries that were dispatched and therefore deallocated. The vector is 20 bits wide, in one embodiment, and maintains a bit set for each deallocated entry. The DEALLVECTOR is updated as entries are dispatched by the RS 305. The RS is the only buffer of the allocated resources that is not sequentially deallocated.

The ID block 210 forwards instructions over bus 434 because the allocator must receive the number of instructions within a given clock and also the type of the issued instructions. The RAT 214 generates the RA Stall over bus 422 which is fed to the allocator 210 and also the ID block 201. The AL Stall signal 432 is generated by the allocator unit 210 and is also fed to the ID block 210. If either AL Stall or RA Stall becomes asserted, the ID block 201 will stall and cease issuing new instructions until the stall signals are removed. While stalled, the ID block 201 continually issues (maintains) the same set of instructions that were issued during the clock cycle that the stall was asserted (over either 432 or 422).

The allocator 210 interacts with both the in-order and out-of-order sections of the processor. Specifically, the allocator 210 interacts with instruction issue block 201 (including a branch target buffer), register alias table (RAT) 214, the integer execution unit 302, ROB 306, RS 305, and MOB 503. During each clock cycle of the processor 212, the allocator 210 prepares to allocate three (or four) ROB 306, RS 305, and load buffer entries within MOB 503. In addition, the allocator 210 prepares to issue two store buffer entries within MOB 503. In order to allocate the appropriate resources, the allocator 210 generates pointers to the appropriate resources by decoding the instructions input from the instruction issue unit 210. The decoded instructions permit the allocator 210 to ascertain specific resources required for the instructions. In addition, the decoded instructions indicate a specific RS 305 dispatch port. The decoded instructions contain a instruction valid bit that permits the allocator 210 to further qualify resources required. Based on the resources required and validity of the instructions, the allocator 210 ascertains the availability of resources for the instructions.

Allocation Pipestages. Referring back to FIG. 2, the allocator 210 allocates certain instructions to certain buffers for different periods of the pipeline 10. For each clock cycle, a predetermined number of instructions are issued from instruction stage 10(b) and are allocated to the appropriate buffers. All instructions of a given clock cycle are allocated an entry to the ROB 306 during allocation 10(c). Therefore, if four instructions were issued from pipestage 10(b) for a given clock cycle, there would be four entries allocated within ROB 306. All instructions, except for the floating point register exchange instruction (FXCH) are assigned an entry in the RS 305 during allocation 10(c). The FXCH instruction is executed within the RAT by swapping a particular pair of register pointers to the ROB, therefore the FXCH does not have to be scheduled by the RS 305. According to the present invention, of the instructions issued from stage 10(b), only load instructions are allocated an entry of the load buffer, and similarly, only store instructions are allocated an entry of the store buffer. Both occur during allocation 10(c). FIG. 2 illustrates the allocation phases for each of the four buffers of the present invention as described below.

Instructions are allocated to the ROB during allocation pipestage 10(c) by the allocator 210 and remain allocated to the ROB until the instruction retires at pipestage 10(g). Upon retirement, the information and the entry of the ROB associated with the retiring instruction are made available for subsequent use and are deallocated (e.g., invalid). At retirement, the data from the ROB is allowed to update the RRF and therefore there is no need to contain retired instruction information within the ROB. Instructions (except for FXCH) are allocated to the reservation station 305 at allocation pipestage 10(c) by the allocator 210 and remain allocated within entries of the RS until dispatch at pipestage 10(e). At dispatch, the instruction information is sent to the execution units where it becomes executed at pipestage 10(f) and therefore there is no longer a need for the instruction information to be allocated within the RS after dispatch. Therefore, the instruction information associated with a dispatched instruction becomes deallocated (invalid) at dispatch and may be used for a subsequent allocation. It is appreciated that the entries of the RS become deallocated before retirement 10(g).

Load instructions are allocated to the load buffer (807) during allocation stage 10(c) by the allocator 210 and are allocated until retirement when the load instruction updates the architecturally visible portions of the computer system and processor of the present invention. Store instructions are allocated by the allocator 210 at allocation 10(c) and remain allocated to the store buffer until the store operation occurs over the external bus 211. This may occur post retirement at stage 10(h). Store instructions are placed into a store buffer (store address buffer 802 and store data buffer 701) after issuance. It is appreciated that because the store operations are buffered, the actual store operation for a given store instruction may be performed at some time after retirement of the store instruction (e.g., some time after the entry associated with the store instruction is deallocated by the ROB). Store operations are performed when they are placed over the external bus 211. Therefore, store instructions are allocated within the store buffer post retirement 10(g). As shown in FIG. 2, stage 10(h) of the pipeline format provides for operations that occur post retirement.

It is appreciated that 10(h) is not actually an additional pipestage to the format 10 of the present invention, but is only illustrated as such to teach that store operations may occur subsequent to retirement. Also, while the store buffer of the present invention is implemented as two separate buffers (one for address 802 and one for data 701) alternative implementations that are well known (e.g., using one buffer) may be used consistent within the scope of the present invention. For instance, a single store buffer for both address and data may be utilized within the present invention.

Figure 16:
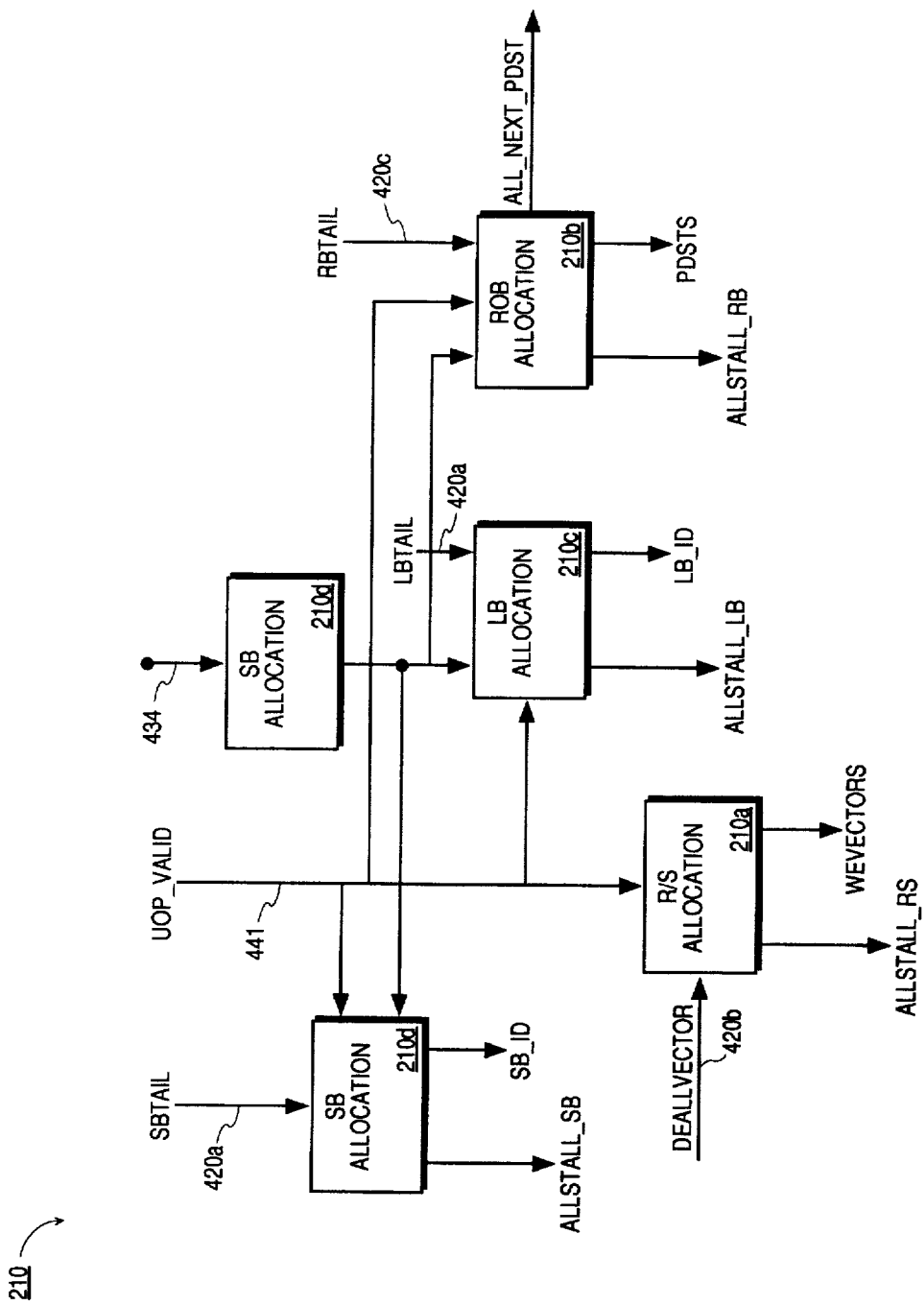
FIG. 16 is a block diagram illustrating internal structure of the allocator of the present invention.

Types of Allocation. The allocator 210 allocates entries of the resources differently. Load instructions are allocated to entries of the load buffer in a sequential manner. Store instructions are allocated to entries of the store buffer in a sequential manner. Instructions allocated to entries of the ROB are allocated in a sequential manner. The reservation station (RS) 305 allocates on the basis of the first number of entries that are free. Because instructions within the RS may become dispatched at different times, the allocator scans the entries within the reservation station to locate the first number of entries that are free. In one implementation, four entries are allocated to the RS per clock cycle. These entries may be located anywhere in the RS. Therefore, the allocator 210 scans the RS to locate the first four vacant entries, and these are allocated at stage 10(c). In another implementation, three entries are allocated to the RS per clock cycle. Generally, the allocation process for the RS is an all or nothing allocation in that if four (or three) vacancies are not found for a given clock cycle, the instruction fetch and issue portions of the processor must be stalled until the resources become available. It is appreciated that a number of different implementations may be adopted within the scope of the present invention for allocating entries to the reservation station 305, for instance, entries may be allocated to the RS based randomly, or otherwise nonsequentially. Allocated entries of the RS are sent over bus WEVECTORS (FIG. 16).

Allocator substructure. Refer to FIG. 16 which illustrates internal structure of the allocator 210. The allocator 210 contains four suballocator units which control the allocation of the buffer resources. The instruction decode unit 210e decodes the instructions issued from the ID block 201 over bus 434. The decode unit 210e indicates which instructions are load and store instructions and which instructions do not need to be allocated to the RS (e.g., which are floating point exchange operations). Also, unit 210e indicates the number of instructions in the current clock cycle for updating the internal allocation pointers. The store buffer allocator 210d performs sequential allocation to the store buffer 802. Allocator 210d receives the store buffer tail pointer over bus 420a and also receives an input from the decoder 210e indicating the number of store instructions for updating the internal lead pointer for the store buffer. The store buffer allocator 210d generates a store buffer stall (ALStall_SB) if the store buffer is full and unable to allocate for the current clock cycle. Unit 210d also generates SB_ID signals indicating the entries sequentially allocated to the store instructions (if any) of the current cycle. Bus 441 indicates which instructions are valid or invalid. As will be discussed later, due to the RA Stall condition, some instructions of the current cycle may not be validly allocated, but others may. Bus 441 indicates the valid and invalid instructions and only valid instructions are allocated.

The load buffer allocator 210c performs sequential allocation of the load buffer and is similar in function as unit 210d. The load buffer tail pointer is received from the load buffer 807 over bus 420a and also the decoder unit 210e informs block 210c of the number of load instructions in the current cycle for updating the internal head pointer for the local buffer. Bus 441 informs block 210c which instructions are valid, only valid instructions are allocated. Block 210c generates an ALstall_LB signal if the load buffer is full and no entries are available for the load instructions of the current cycle. The ROB allocator 210b performs sequential allocation of the ROB 306 and is similar in function as unit 210d and unit 210c. The ROB tail pointer is received from the ROB over bus 420c and also the decoder unit 210e informs block 210b of the number of instructions in the current cycle for updating the internal head pointer to the ROB. All instructions receive a ROB entry. Bus 441 informs block 210b which instructions are valid and only valid instructions are allocated. Block 210b generates an ALstall_RB signal if the ROB is full and no entries are available for the instructions of the current cycle. Block 210b also generates the AL_NEXT_Pdst pointer value used by the ROB to mark the end of the reorder buffer for instruction retirement.

The reservation station allocator 210a nonsequentially allocates entries of the RS 305 as they become deallocated. Since RS entries may become deallocated out of order, a circular buffer scheme with sequential allocation does not lend itself to the RS. Unit 210a scans the entries of the RS (as reported over bus 420b) that are vacant and allocates the first ones from a given reference point, as needed, to the instructions of the current cycle. The RS receives input from bus 441 indicating the valid instructions. Also the RS receives a deallocation vector signal from bus 420b from the RS 305 indicating those entries that become deallocated because they were dispatched. Unit 210a generates an ALStall_RS signal when there are not enough entries to assign to the instructions of the current cycle. Also, the RS allocation 210a generates write enable vector indicating those entries allocated for the instructions of the current cycle.

The suballocators (210b–210d) of FIG. 16 maintain the current addresses pointed to by the head pointers for the ROB, the store buffer, and the load buffer so that during allocation the appropriate new addresses can be generated if and when needed. After each clock cycle, assuming a stall condition is not asserted, the head pointers for the ROB, load and store buffers are updated in accordance with the entries allocated to each buffer, respectively. The tail pointers for the load buffer, the ROB and the store buffer are generated by each respective buffer (and updated during deallocation) and sent to the respective suballocator (store buffer, load buffer, ROB) so that the suballocator is informed of the buffer full status. The RS suballocator 210a also maintains a list of vacant RS entries and each cycle generates write enable vectors to indicate the entries allocated for a given cycle. The allocator uses all of the above information to determine allocator stall generation; any of the suballocators 210a–210d may generate a stall signal. Thus, the load buffer, the ROB, and the store buffer communicate the value of the tail pointer to the allocator so that the allocator may track deallocation of the entries at retirement or when store instructions are performed. Further, the RS 305 communicates to the allocator those entries that become dispatched and therefore deallocated.

As discussed, each suballocator is capable of generating a stall signal (ALStall_SB, ALStall_LB, ALStall_RB, and ALStall_RS) indicating that their respective buffer is full. The signal AL Stall 432 is generated by the allocator 210 by OR'ing or the otherwise combining the signals ALStall_SB, ALStall_LB, ALStall_RB, and ALStall_RS. Once AL Stall 432 is asserted, all of the uops currently issued within the cycle generating AL Stall become invalid and bus 441 indicates such accordingly.

Sequential Allocation. The process utilized by the allocator 210b of the present invention for sequentially allocating entries of the ROB, load and store buffers is now discussed. Although discussed with reference to the ROB, it is appreciated that the following sequential allocation procedure may be applied to the sequential allocation performed by the allocator units 210c and 210d for entries of the load and store buffer. The ROB 306 contains a circular buffer to store n entries, wherein each entry stores the results of executed instructions. The allocator 210b allocates an entry in ROB 306 for each instruction. The allocator 210b allocates and deallocates entries in the ROB 306 in a FIFO manner. Upon allocation of a instruction to a reorder buffer entry, the allocator 210b provides a reorder unit of the ROB with physical destination addresses to identify the allocation. During the high phase of the system clock, the allocator 210b provides the three physical destination addresses to the reorder unit. In a subsequent low phase of the clock cycle, the in-order fetch and issue cluster unit 201 provides information to write entries into the ROB 306. On the low phase of the clock cycle, ROB 306 entries receive data. In a preferred embodiment, up to three or four instructions are allocated in the ROB 306 in any given clock.

Figure 17:
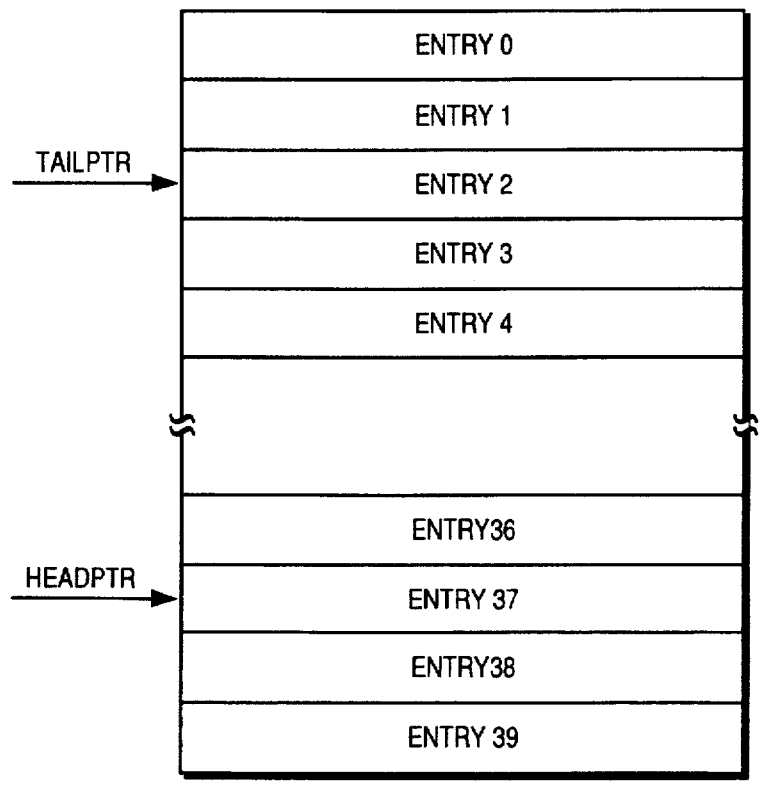
FIG. 17 is a block diagram of a sequential buffer allocation scheme of the present invention.

FIG. 17 illustrates a logical diagram of the ROB 306 buffer configured in accordance with the present invention. The ROB 306 buffer contains a predetermined number of entries, wherein each entry is identified by a Pdst. In addition to sequentially identifying each entry in the buffer, each Pdst contains a wrap bit. The wrap bit comprises the most significant bit of the Pdst. The allocation unit 210 allocates entries for instructions in a first in first out (FIFO) manner. The ROB 306 buffer is a circular buffer, such that allocation of the last entry is followed by allocation of entry 0. Each time the allocation unit 210 traverses the entire circular buffer, the allocation unit 210 toggles the wrap bit. The wrap bit is utilized to distinguish between empty and full conditions of the buffer. In order to allocate entries in the ROB 306 to instructions, the allocation unit 210 compares the tail pointer and the head pointer. The head pointer indicates the first valid entry (or the next valid entry) and the tail pointer indicates the last valid entry. If the tail pointer and the head pointer match and contain equivalent wrap bits, then the ROB 306 buffer is empty. If the tail pointer and the head pointer match and the wrap bits are different, then the ROB 306 buffer is full. For the example shown in FIG. 17, the tail pointer points to entry 2, and the head pointer points to entry 37. If the wrap bits for the head pointer and tail pointer are equivalent, then entries 3 through 37 are available for allocation.

The ROB 306 buffer entries are allocated and deallocated sequentially. In a preferred embodiment, the issue unit 201 issues three (or four) instructions per clock cycle and for each clock cycle, the allocation unit 210 seeks to allocate three (or four) free slots in the ROB 306. If three empty slots are not available, then the processor must stall the issue unit 201. If three empty slots are available, then the allocator 210 transmits three Pdsts to the ROB 306. The three Pdsts indicate the three empty slots for use with the three incoming instructions issued for that clock cycle. The tail pointer, generated by the ROB 306, is input to the allocator 210. Whenever a retirement from the ROB 306 occurs, the ROB 306 increments the tail pointer. At the end of the allocation cycle, the address of the last ROB entry allocated is preserved and utilized as a new starting point for the next allocation cycle.

The allocation unit 210 utilizes an all or nothing allocation policy. The allocator 210 determines whether three entries, one for each instruction, are available. If three entries are not available, then no entries in the ROB 306 are allocated for any of the instructions and ALSTALL_RB is asserted. Consequently, the ROB allocation is independent of the type of instruction or whether the instruction is valid. The all or nothing allocation policy of the present invention simplifies subsequent ROB 306 buffer writes. For example, if only a portion of the instructions from a particular clock cycle were allocated to the ROB 306 buffer, additional logic would be required to write operand data corresponding to the instructions from two different clock cycles. In addition to reducing logic, allocation is accomplished more quickly than allocating a portion of the instructions. The all or nothing allocation policy is particularly advantageous in ROB allocation of the present invention because every instruction needs a ROB entry.

PART IV—ALLOCATION HANDLING DURING STALL CONDITIONS

RA Stall Generation. As discussed previously, tile RAT unit generates the RA Stall signal 422 in response to a data dependency between instructions accessing partial widths of the same register. The generation of the RA Stall signal 422 is now discussed. The RAT unit 214 receives an in order stream of instructions from the issue unit 201. Each clock cycle, a current set of instructions is received and processed by the RAT. The RAT receives two logical source register and one logical destination register per instruction forwarded by the issue unit 201. The logical registers are those that will become architecturally visible in the RRF once the instructions eventually retires. Within a given cycle, the RAT also receives a list of the newly allocated Pdsts (ROB entries) from the allocator 210. The RAT will assign a Pdst for each logical destination register of the current set of instructions. In effect, the RAT renames the logical destination registers received from the issue unit 201 to entries within the ROB (all Pdsts). Once renamed to a Pdst, the next time an instruction requires the use of that register as a source, the RAT will supply the renamed Pdst until the register is renamed again. The RAT array is thus indexed by the logical register name and outputs a corresponding Pdst, the most recently assigned Pdst.

The RAT table maintains only the most recently renamed destination register. That is, each time an instruction writes to a given register, the RAT array is updated. Each time an instruction sources a register, the RAT array is read. Therefore, the RAT supplies to a source register only the most recently assigned Pdst for that register.

Generally, the RAT array maintains a single entry for the maximum width of each register. Some registers have addressable partial widths. For instance, the EAX register is 32 bits but the lower 16 bits of the register (e.g., the AX register) is separately addressable. Further, the lower 8 bits of the register (e.g., AL) is also addressable. Therefore, there will be a potential problem if one instruction writes to a register partial width and a subsequent instruction reads a superset of that partial width of the same register. Part of this issue arises because generally the RAT array contains a single entry for renaming the EAX register, the AX register, the AH register and the AL register. For instance, if one instruction writes to the AX register then a subsequent (succeeding) instruction reads from the EAX register a potential problem will occur. The RAT array 214 will assign a Pdst(n) to represent the AX register for the first instruction, but the Pdst(n) only represents the lower 16 bits of the EAX register. When the succeeding instruction that sources the EAX register is processed by the RAT, the RAT is unable to supply the Pdst(n) to rename the entire EAX source register (32 bits wide) because the RAT entry for the EAX register only maintains the 16 lowest bits of the EAX register (e.g., AX) and does not currently map the location of the upper 16 bits. In this situation, the RAT unit and also the issue unit must stall until the first instruction retires (and necessarily, all previous instructions retire). At retirement, the entire 32 bits of the EAX register may be sourced from the RRF. Therefore, the RAT will supply the RRF address as the proper source for the EAX register, in lieu of a ROB entry.

As soon as the RAT 214 determines that a partial width dependency occurs, as described above, then it will generate the RA Stall signal over bus 422 within the clock cycle that causes the partial width dependency. The RA Stall signal is asserted in the above example until the clock cycle that first instruction retires. The succeeding instruction, and every instruction subsequent is stalled and will not be allocated by the allocator 210 until the RA Stall is deasserted.

The RAT 214 generates valid bits, one bit for each instruction of a given clock cycle that indicate to the allocator which instructions to allocate and which instructions not to allocate. The RAT 214 will mark as invalid the succeeding instruction (e.g., the one that reads a superset of the register width presently contained within the RAT array) and every instruction subsequent to that instruction during a partial stall. For example, consider the below instructions issued from 201 within a given clock cycle and processed by the RAT unit.

| | CYCLE n: | | VALID BITS |
|---|---|---|---|
| uop0 | ADD | AX and BX → AX | 1 |
| uop1 | LOAD | EAX | 0 |
| uop2 | SUB | EAX, EBX → EBX | 0 |
| uop3 | STORE | EBX | 0 |

Since uop1 reads EAX and since uop0 generates only AX, the RAT must stall until uop0 retires and then the value of EAX may be obtained from the RRF. Uop1 is partially data dependent on (has a partial register with data dependency on) uop0 because uop1 requires the use of AX (which uop0 generates) and in addition also requires the upper 16 bits of the EAX register. It is appreciated that uop0 does not necessarily need to be within the same clock cycle as uop1; it may be associated with a prior clock cycle and still cause a partial width data dependency with uop1. During this clock cycle, the RAT 214 will generate the RA Stall signal which will be asserted until the uop0 retires. The RAT 214, over bus 441 generates valid bits as shown. Uop0 is valid because the RA Stall does not effect the ADD instruction and will be allocated by the allocator 210 to the buffer resources. Uops 1–3 are invalid and stalled (as well as all subsequent instructions) and will not be allocated by the allocator 210. While RA Stall is asserted, the present invention causes issue unit 201 to stall and will not issue further instructions. In response to the RA Stall, within the clock cycle that the RA Stall occurs, the allocator 210 will allocate only those instructions that are marked as valid and at the end of the allocation pipestage, the allocator will not update its internal allocation pointers (e.g., the write enable vector for the RS and the head pointers for the store, load and reorder buffer) but will advance special pointer called the AL_NEXT_Pdst which represents the value of the ROB's internal head pointer if it had been advanced.

The AL_NEXT_Pdst is sent to the ROB so that the ROB may properly allow the partially allocated instructions of cycle n to retire. Allocation handling in response to deassertion of the RA Stall signal is discussed hereinafter. Since the ROB retires entries in order, it uses the value of the ROB header to determine which ROB entries to retire (e.g., when retirement is complete). If this head pointer was not advanced during a partial stall, then the ROB would never retire the partially allocated instructions (because retirement would stop before the instructions were reached) and therefore the partial stall would never become deasserted. It is appreciated that invalid instruction information (related to the stalled instructions) may be written into the ROB within the clock cycle that the RA Stall was asserted. However, the valid bits corresponding to the uops are also written into the ROB and therefore the ROB is able to distinguish the valid and invalid instructions. Regarding the above example, information related to uops0–3 may be written into the ROB during a partial stall assertion but uops1–3 will be marked as invalid since uop0 is the only valid uop. Uops1–3 are not allocated to the ROB because they are marked invalid and the ROB will not retire an invalid uop. During RA Stall, it is appreciated that the internal head pointer to the ROB (maintained by the allocator 210) is not advanced, only the AL_NEXT_Pdst pointer (a ROB head pointer used for retirement).

AL Stall Generation. As discussed above, the AL Stall signal 432 is generated as a result of a buffer resource having no available entries. When the AL Stall signal is generated, the present invention causes the RAT 214 to invalidate all of the instructions of the current clock cycle wherein the AL Stall was generated and updates bus 441 accordingly. In response to the AL Stall signal, and within the clock cycle wherein the AL Stall is generated, the allocator will not allocate any of the instructions of the current set. Also, the allocator 210 will not advance any of the allocation pointers (e.g., the write enable vector and the head pointers for the store, load and reorder buffer) within the clock cycle that caused the AL Stall. Also, during AL Stall, the issue unit 201 is stalled and will not issue new instructions. The pointer AL_NEXT_Pdst is not advanced during AL Stall.

Deassertion of RA Stall and AL Stall. During the clock cycle that RA Stall 422 is deasserted, the present invention will mark as valid those instructions of the current set of instructions that were previously marked invalid and were stalled. Also, those instructions of the current set that were partially allocated will be marked as invalid by the RAT. Therefore, the present invention allocator will effectively allocate only those instructions that were stalled. After allocation, the internal allocation pointers are advanced and at this time the internal head pointer for the ROB will be equal to the AL_NEXT_Pdst. It is appreciated that while RA Stall is asserted, the issue unit 201 was stalled and therefore the same set of instructions were constantly issued and held. Upon the subsequent clock cycle after the deassertion of the RA Stall, assuming AL Stall is not asserted, a new set of instructions will issue and become allocated to new entries of the buffer resources.

During the clock cycle that the AL Stall signal 432 is deasserted, the stalled instructions are allocated and the internal allocation pointers are updated by the present invention. Upon deassertion of the AL Stall, the issue unit 201 is also no longer stalled, unless the RA Stall signal is asserted. Upon the subsequent clock cycle, a new set of instructions will issue and become allocated to new entries of the buffer resources. It is appreciated that the AL Stall signal becomes deasserted when enough entries become available within the buffer resources to allocate to the current set of instructions. As discussed above, entries become deallocated for different buffers at different pipestages of the pipeline of the present invention.

Timing Diagram. FIG. 18(A) illustrates a timing diagram of the assertion and deassertion of the AL Stall signal 432 for exemplary sets of instructions for a number of clock cycles and assumes that the RA Stall signal remains deasserted from cycle 0 to cycle 6. At clock cycle 0, a first set of instructions is received from the issue unit and allocated to the buffer resources and the internal allocation pointers (e.g., head pointers for load, store and reorder buffers and also a new write enable vector for the RS) are then advanced. At cycle 1, a second set of instructions is issued and is attempted to become allocated, but a buffer resource becomes full and therefore during this cycle the AL Stall signal is asserted by the present invention as shown. All of the instructions of the second set are marked as invalid and none are allocated and the issue unit is stalled. Since the AL Stall is asserted, the allocator 210 does not advance the internal allocation pointers but uses the same pointers that were generated at the end of cycle 0. During cycles 2 through 4 the AL Stall signal remains asserted and the second set of instructions is stalled and the allocation pointers are held constant and all instructions of the second set remain invalid to prevent allocation.

At cycle 5 of FIG. 18(A), the AL Stall signal becomes deasserted as the requisite buffer resources become available for allocation to the second set and the present invention validates the stalled second set of instructions causing the allocator 210 to allocate the second set of instructions (assuming an RA Stall is not also asserted). After, the allocator advances the allocation pointers to a new set. At cycle 6, a third set of instructions is issued and are allocated and the allocation pointers are then advanced.

FIG. 18(B) illustrates a timing diagram of the assertion and deassertion of the RA Stall signal 422 for exemplary sets of instructions for a number of clock cycles and assumes that the AL Stall signal is not asserted from cycle 0 to cycle 6. At cycle 0, a first set of instructions is issued and allocated by the allocator 210 of the present invention. The internal allocation pointers are then advanced. At cycle 1, a second set of instructions are issued and during allocation the RA Stall signal is asserted because of a partial width data dependency between two or more instructions of the second set or between an instruction of the given set and a prior instruction of a previous clock cycle. Assume that uop0 writes a partial register width and that uop1 a later uop sources a superset width of that same register. When RA Stall goes high, the issue unit 201 is stalled and uop0 is marked valid but uop1 and the subsequent uops of the second set are marked invalid. At cycle 1, uop0 is allocated to the buffer resources. Also, at cycle 1, the pointer AL_NEXT_Pdst (which normally mirrors the ROB head pointer internal to the allocator 210) is advanced but the internal allocation pointers (e.g., head pointers for store, load, and reorder buffer, and write enable vectors for reservation station) remain constant and are not advanced. Therefore, during cycle 1, a partial allocation occurs of the second set of instructions.

During cycles 2, 3, and 4 the RA Stall signal remains asserted and the allocation pointers remain the same and all instructions of the second set become invalid to prevent double allocation of uop0. After retirement of uop0 of the second set, the RA Stall signal is deasserted and the previously stalled instructions of the second set am then allocated. Then, the allocation pointers are advanced and then the ROB head pointer will equal the AL_NEXT_Pdst pointer value. At cycle 5, a partial allocation occurs of the second set of instructions. During cycle 6, a third set of instructions are received and allocated and the allocation pointers are advanced to a new set. It is appreciated that the ROB 306, retires entries sequentially, needs to receive the advanced AL_NEXT_Pdst pointer so that the uop0 can be retired properly. Otherwise, while the RA Stall was asserted, retirement might have stopped at the ROB entry indicated by the non-advanced ROB head pointer which would not have included uop0 since this header was not advanced at the end of cycle 1.

Figure 19:
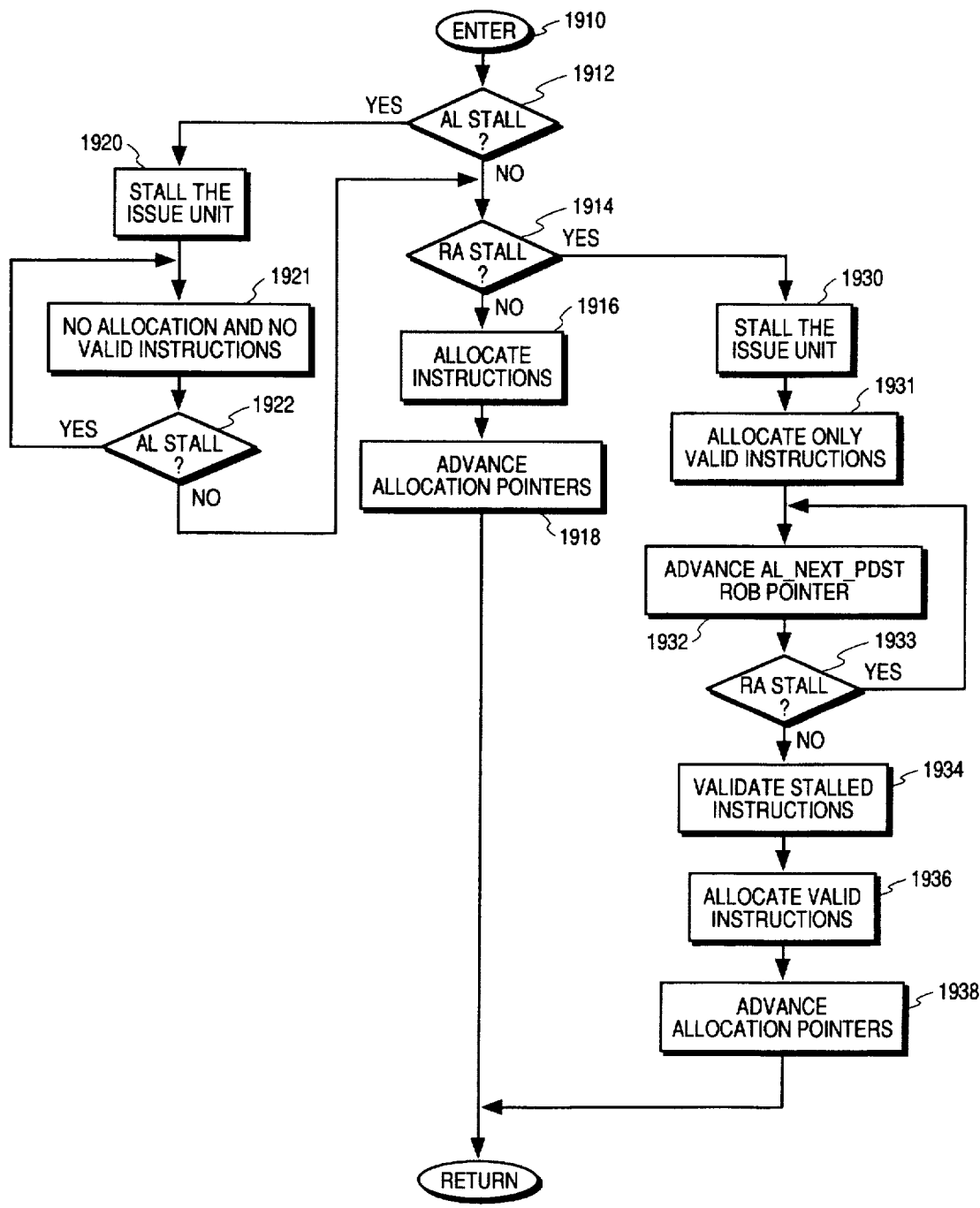
FIG. 19 is a flow diagram illustrating the handling of the full and partial stall conditions within the allocator of the present invention.

Flow Diagram. FIG. 19 illustrates a diagram of the processing flow 1905 of the present invention to perform the partial allocation features of the present invention during stall handling. The cyclic process starts at block 1910, and at block 1912 if the AL Stall signal 432 (full stall) is asserted during a given clock cycle, then block 1920 is entered where issue unit 201 is stalled. No allocation occurs for the instructions of the given clock cycle and all instructions are marked invalid by the present invention at block 1921. No allocation pointers are updated and this condition remains constant until the AL Stall signal is deasserted as checked by block 1922. Upon a subsequent clock cycle when the AL signal is deasserted, processing of the present invention flows from block 1922 to block 1914 to check if the RA Stall is also asserted. The AL Stall and the RA Stall may be asserted simultaneously. If the RA Stall is not asserted, then at block 1916 the previously stalled instructions are validated and allocated to the buffer resources by the allocator 210. Also, the issue unit 201 is allowed to continue. At block 1918, the internal allocation pointers are then updated. The flow of the present invention then enters block 1940 and starts over.

At block 1912, if the AL Stall signal is not asserted during a given clock cycle then at block 1914 the RA Stall signal 422 (partial stall) is checked by the present invention. If asserted, at block 1930 the issue unit 201 is stalled and at block 1931 the RAT 214 validates only a portion of the instructions of the given cycle that are not partially data dependent on a previous instruction. These instructions are allowed to allocate to the resource buffers while the partially data dependent instructions remain stalled. At block 1932, the AL_NEXT_Pdst pointer to the ROB is allowed to advance so that the partially allocated instructions may retire properly. This pointer normally mirrors the head pointer to the ROB and is used by the ROB as an end marker for retiring entries of the ROB. The internal allocation pointers of the allocator 210 are not advanced by the present invention. At block 1933, the RA Stall signal is checked, if asserted, the state is held constant but the partially allocated instructions of the current cycle are invalidated to prevent double allocation. When the partially allocated instructions (e.g., the instructions allocated at block 1931) retire, the RA Stall is deasserted and at block 1934 the previously stalled instructions of the given cycle are marked valid. The issue unit 201 is also allowed to issue instructions at block 1934. Only these instructions are allocated to the buffer resources at block 1936 and at block 1938, the internal allocation pointers are then advanced. At this time the ROB header equals the value of AL_NEXT_Pdst. Flow then returns to block 1940 to repeat. It is appreciated that when the RA Stall signal is deasserted, the AL Stall is not asserted and therefore is not checked by the present invention. If the AL Stall and RA Stall were asserted at the same time, the AL Stall would be processed first by the present invention.

At block 1914, if the RA Stall signal was not asserted in the given clock cycle, then at block 1916, the instructions of the given cycle are allocated to the buffer resources and at block 1918, the allocation pointers (e.g., the head pointers for the load, store and reorder buffers and the write enables for RS) are advanced by the present invention. If the issue unit 201 was stalled, it would be allowed to continue at this time. Flow then continues to block 1940 and repeats. It is appreciated that if an RA Stall occurs and an AL Stall occurs, the AL Stall takes priority as shown in flow 1905 of the present invention.

It is appreciated that the present invention utilizes the AL_NEXT_Pdst pointer so that the partially allocated instructions of block 1931 may properly retire. However, it is appreciated that a number of various methods may be employed within the scope of the present invention to allow the partially allocated instructions to retire and the above is one such exemplary embodiment. The present invention should not be considered limited to the embodiment utilizing the AL_NEXT_Pdst mechanism. As shown in flow 1905 a process of partially allocating instructions during a partial stall is illustrated. Further, handling of both a partial and full stall is illustrated.

Thus, the present invention, a method an apparatus for efficiently allocating resources of a reservation station, a reorder buffer, a store buffer and a load buffer during different stall conditions has been described. Whereas many alterations and modifications of the present invention will become apparent to a person of ordinary skill in the art after having read the foregoing description, it is to be understood that the particular embodiments shown and described by way of illustration are in no way intended to be considered limiting. Therefore, references to details of the preferred embodiment are not intended to limit the scope of the claims which recite the essential features.

We claim:

1. An apparatus for allocating resources of a processor to instruction information, said apparatus comprising:

a first buffer and a second buffer for containing information associated with instructions for processing by said processor;

allocation logic for allocating entries of said first buffer and said second buffer to some instructions of a given set of instructions in response to a partial stall condition while suspending allocation of other instructions of said given set of instructions, wherein said partial stall condition is asserted in response to partial register width data dependency between instructions of said given set of instructions; and wherein said allocation logic is also for suspending allocation of any instructions of said given set of instructions in response to a full stall condition, wherein said full stall condition is asserted if said first buffer or said second buffer is full.

2. An apparatus for allocating resources as described in claim 1 wherein said given set of instructions comprise instructions issued within a common clock cycle by said processor.

3. An apparatus for allocating resources as described in claim 2 wherein said first buffer is an architecturally invisible buffer for containing operand and result information associated with speculative instructions and wherein said second buffer is for containing information associated with instructions pending execution by said processor.

4. An apparatus for allocating resources as described in claim 2 wherein said partial stall condition is asserted in response to a first instruction writing to a first partial width of a given register and a succeeding instruction reading a second partial width of said given register, wherein said second partial width is a superset of said first partial width and wherein said succeeding instruction is of said given set of instructions.

5. An apparatus for allocating resources as described in claim 2 wherein said allocation logic is also for allocating entries of said first buffer and said second buffer to all instructions of said given set of instructions in response to deassertion of said full stall condition.

6. An apparatus for allocating resources as described in claim 2 wherein said allocation logic is also for allocating entries of said first buffer and said second buffer to suspended instructions of said given set of instructions in response to deassertion of said partial stall condition.

7. An apparatus for allocating resources of a processor to a given set of instructions issued by said processor within a common clock cycle, said apparatus comprising:

a first buffer for maintaining source operand and destination register information associated with speculative instructions;

a second buffer for containing information associated with instructions pending execution by said processor;

allocation logic for suspending allocation of all instructions of said given set of instructions in response to a full stall condition, wherein said full stall condition is asserted if said first buffer is full or said second buffer is full; and wherein said allocation logic is also for allocating entries of said first buffer and said second buffer to a first portion of said given set of instructions in response to a partial stall condition while suspending allocation of a second portion of said given set of instructions in response to said partial stall condition, wherein said partial stall condition is asserted in response to a partial register width data dependency between an instruction of said given set of instructions.

8. An apparatus for allocating resources in response to stall conditions as described in claim 7 wherein said allocation logic is also for allocating said second portion of said given set of instructions in response to deassertion said partial stall condition.

9. An apparatus for allocating resources in response to stall conditions as described in claim 7 wherein said allocation logic is also for allocating said all instructions of said given set of instructions in response to deassertion of said full stall condition provided said partial stall condition is not asserted.

10. An apparatus for allocating resources in response to stall conditions as described in claim 7 wherein said first buffer is an architecturally invisible buffer.

11. An apparatus for allocating resources in response to stall conditions as described in claim 7 wherein said partial stall condition is asserted in response to a first instruction writing to a first partial width of a given register and a succeeding instruction of said second portion of said given set reading a second partial width of said given register, wherein said second partial width is a superset of said first partial width.

12. An apparatus for allocating resources in response to stall conditions as described in claim 11 wherein said allocation logic is also for allocating said second portion of said given set of instructions in response to deassertion said partial stall condition, and wherein said partial stall condition is deasserted upon retirement of said first instruction.

13. An apparatus for allocating resources in response to stall conditions as described in claim 7 wherein said allocation logic comprises:

a first suballocator for allocating entries to said first buffer, said first suballocator also for generating a first stall condition provided said first buffer becomes full;

a second suballocator for allocating entries to said second buffer, said second suballocator also for generating a second stall condition provided said second buffer becomes full; and stall generation logic for generating said full stall condition upon assertion of said first stall condition or second stall condition.

14. An apparatus for allocating resources of a processor to a first and a second instruction issued by said processor within a common clock cycle, said apparatus comprising:

a first buffer for maintaining source operand and destination register information associated with speculative instructions;

a second buffer for containing information associated with instructions pending execution by said processor;

allocation logic for suspending allocation of said first instruction and said second instruction in response to a full stall condition, wherein said full stall condition is asserted if said first buffer or said second buffer is full; and wherein said allocation logic is also for allocating entries of said first buffer and said second buffer to said first instruction in response to a partial stall condition while suspending allocation of said second instruction in response to said partial stall condition, wherein said partial stall condition is asserted in response to partial register width data dependency between a previous instruction and said second instruction.

15. An apparatus for allocating resources in response to stall conditions as described in claim 14 wherein said previous instruction is said first instruction of said common clock cycle.

16. An apparatus for allocating resources in response to stall conditions as described in claim 14 wherein said allocation logic is also for allocating said second instruction in response to deassertion said partial stall condition.

17. An apparatus for allocating resources in response to stall conditions as described in claim 14 wherein said allocation logic is also for allocating said first and second instructions in response to deassertion of said full stall condition.

18. An apparatus for allocating resources in response to stall conditions as described in claim 15 wherein said partial stall condition is asserted in response to said first instruction writing to a first partial width of a given register and said second instruction reading a second partial width of said given register, wherein said second partial width is a superset of said first partial width.

19. An apparatus for allocating resources in response to stall conditions as described in claim 15 further comprising a retirement register buffer and wherein said partial stall condition is deasserted upon retirement of said first instruction.

20. An apparatus for allocating resources in response to stall conditions as described in claim 14 further comprising:
- a third buffer for containing information associated with load instructions;
- a fourth buffer for containing information associated with store instructions; and
- wherein said allocation logic is also for suspending allocation of said first instruction and said second instruction in response to said full stall condition, wherein said full stall condition is also asserted if said third buffer is full or said fourth buffer is full; and
- wherein said allocation logic is also for allocating entries of said third buffer and said fourth buffer to said first instruction in response to said partial stall condition while suspending allocation of said second instruction in response to said partial stall condition.

21. An apparatus for allocating entries of buffer resources to a first instruction and a second instruction issued by a processor within a common clock cycle, said apparatus comprising:
- allocator logic for allocating entries of said buffer resources to said first instruction and to said second instruction, said allocator logic comprising:
  - a first allocator for allocating entries of a first buffer, said first buffer for containing operand and result information associated with speculative instructions;
  - a second allocator for allocating entries of a second buffer, said second buffer for containing information associated with instructions pending execution by said processor;
- wherein said allocator logic is also for allocating entries of said first buffer and said second buffer to said first instruction in response to assertion of a partial stall signal, wherein said partial stall signal is generated upon a register partial width dependency between said first instruction and said second instruction; and
- wherein said allocator logic is also for suspending allocating of entries of said first and second buffer to said first instruction and second instruction in response to assertion of a full stall signal, wherein said full stall signal is asserted if said first buffer or said second buffer becomes full.

22. An apparatus for allocating entries of buffer resources of a processor as described in claim 21 wherein said allocator logic is also for allocating entries of said first buffer and said second buffer to said second instruction in response to deassertion of said partial stall signal and wherein said allocator logic is also for allocating entries of said first buffer and said second buffer to said first instruction and said second instruction in response to deassertion of said full stall signal.

23. An apparatus for allocating entries of buffer resources of a processor as described in claim 22 wherein said allocator logic further comprises:
- a third allocator for allocating entries of a load buffer, said load buffer for containing information associated with load instructions;
- a fourth allocator for allocating entries of a store buffer, said store buffer for containing information associated with store instructions; and
- wherein said allocator logic is also for allocating entries of said load buffer and said store buffer to said first instruction in response to assertion of said partial stall signal; and
- wherein said allocator logic is also for suspending allocating of entries of said load buffer and said store buffer to said first instruction and said second instruction in response to assertion of said full stall signal.

24. An apparatus for allocating entries of buffer resources of a processor as described in claim 23 wherein said allocator logic is also for allocating entries of said load buffer and said store buffer to said second instruction in response to deassertion of said partial stall signal and wherein said allocator logic is also for allocating entries of said load buffer and said store buffer to said first instruction and said second instruction in response to deassertion of said full stall signal.

25. An apparatus for allocating entries of buffer resources of a processor as described in claim 22 further comprising:
- allocation pointers for indicating entries of said first buffer and said second buffer for allocation; and
- a retirement pointer to said first buffer for indicating a last entry of said first buffer to retire.

26. An apparatus for allocating entries of buffer resources of a processor as described in claim 25 wherein said allocation logic is for advancing said retirement pointer but maintaining constant said allocation pointers upon assertion of said partial stall condition.

27. An apparatus for allocating entries of buffer resources to a first instruction and a second instruction issued by a processor within a common clock cycle, said apparatus comprising:
- allocator logic for allocating entries of said buffer resources to said first instruction and to said second instruction, said allocator logic comprising:
  - a first allocator for allocating entries of a first buffer, said first buffer for containing operand and result information associated with speculative instructions;
  - a second allocator for allocating entries of a second buffer, said second buffer for containing information associated with instructions pending execution by said processor;
- wherein said allocator logic is also for allocating entries of said first buffer and said second buffer to said first instruction in response to assertion of a partial stall signal, wherein said partial stall signal is generated upon a register partial width dependency between a previous instruction and said second instruction; and
- wherein said allocator logic is also for suspending allocating of entries of said first buffer and second buffer to said first instruction and said second instruction in response to assertion of a full stall signal, wherein said full stall signal is asserted if said first buffer or said second buffer becomes full.

28. An apparatus for allocating entries of buffer resources of a processor as described in claim 27 wherein said allocator logic is also for allocating entries of said first buffer and said second buffer to said second instruction in response to deassertion of said partial stall signal and wherein said allocator logic is also for allocating entries of said first buffer and said second buffer to said first instruction and said second instruction in response to deassertion of said full stall signal.

29. An apparatus for allocating entries of buffer resources within a processor as described in claim 28 wherein said allocator logic further comprises:

a third allocator for allocating entries of a load buffer, said load buffer for containing information associated with load instructions;

a fourth allocator for allocating entries of a store buffer, said store buffer for containing information associated with store instructions; and wherein said allocator logic is also for allocating entries of said load buffer and said store buffer to said first instruction in response to assertion of said partial stall signal; and wherein said allocator logic is also for suspending allocating of entries of said load buffer and said store buffer to said first instruction and said second instruction in response to assertion of said full stall signal.

30. An apparatus for allocating entries of buffer resources within a processor as described in claim 29 wherein said allocator logic is also for allocating entries of said load buffer and said store buffer to said second instruction in response to deassertion of said partial stall signal and wherein said allocator logic is also for allocating entries of said load buffer and said store buffer to said first instruction and said second instruction in response to deassertion of said full stall signal.

31. A processor comprising:

an issue unit for issuing a first and a second instruction within a common clock cycle;

an execution unit for executing instructions;

an allocator unit for allocating buffer resources to instructions, said allocator unit comprising first allocation logic for allocating entries of a first buffer, said first buffer for containing operand and result information pertaining to speculative instructions;

second allocation logic for allocating entries of a second buffer, said second buffer for containing instruction information pertaining to instructions pending execution by said execution unit; and wherein said allocator unit is also for suspending allocation of entries of said first buffer and said second buffer to said first instruction and said second instruction in response to assertion of a full stall signal, wherein said full stall signal is asserted if said first buffer or said second buffer becomes full; and wherein said allocator unit is also for allocating entries of said first buffer and said second buffer to said first instruction while suspending allocation of said second instruction in response to assertion of a partial stall signal, wherein said partial stall signal is asserted if said second instruction is partially data dependent on said first instruction.

32. A processor as described in claim 31 wherein said allocator unit is also for allocating entries of said first buffer and said second buffer to said first instruction and said second instruction upon deassertion of said full stall signal.

33. A processor as described in claim 31 wherein said allocator unit is also for allocating entries of said first buffer and said second buffer to said second instruction upon deassertion of said partial stall signal, wherein said partial stall signal is deasserted upon retirement of said first instruction.

34. A processor as described in claim 31 wherein said allocator unit further comprises:

third allocation logic for allocating entries of a load buffer, said load buffer for containing information associated with load instructions;

fourth allocation logic for allocating entries of a store buffer, said store buffer for containing information associated with store instructions; and wherein said allocator logic is also for allocating entries of said load buffer and said store buffer to said first instruction in response to assertion of said partial stall signal and for allocating entries of said load buffer and said store buffer to said second instruction in response to deassertion of said partial stall signal; and wherein said allocator logic is also for suspending allocating of entries of said load buffer and said store buffer to said first instruction and said second instruction in response to assertion of a full stall signal and for allocating entries of said load buffer and said store buffer to said first instruction and said second instruction in response to deassertion of said full stall signal.

35. A computer system comprising:

an external bus for providing a communication pathway;

a memory array coupled to said bus for storing information and instructions;

an input/output unit coupled to said bus for receiving and transmitting information;

a processor coupled to said bus for executing instructions and processing data, said processor comprising an allocator unit for allocating buffer resources to instructions, said allocator unit comprising:

first allocation logic for allocating entries of a first buffer, said first buffer for containing operand and result information pertaining to speculative instructions;

second allocation logic for allocating entries of a second buffer, said second buffer for containing instruction information pertaining to instructions pending execution by said execution unit;

wherein said allocator unit is also for suspending allocation of entries of said first buffer and said second buffer to said first instruction and said second instruction in response to assertion of a full stall signal, wherein said full stall signal is asserted if said first buffer or said second buffer becomes full; and wherein said allocator unit is also for allocating entries of said first buffer and said second buffer to said first instruction while suspending allocation of said second instruction in response to assertion of a partial stall signal, wherein said partial stall signal is asserted if said second instruction is partially data dependent on a previous instruction.

36. A computer system as described in claim 35 wherein said allocator unit is also for allocating entries of said first buffer and said second buffer to said first instruction and said second instruction upon deassertion of said full stall signal.

37. A computer system as described in claim 35 wherein said allocator unit is also for allocating entries of said first buffer and said second buffer to said second instruction upon deassertion of said partial stall signal, wherein said partial stall signal is deasserted upon retirement of said previous instruction.

38. A computer system as described in claim 35 wherein said allocator unit further comprises:

third allocation logic for allocating entries of a load buffer, said load buffer for containing information associated with load instructions;

fourth allocation logic for allocating entries of a store buffer, said store buffer for containing information associated with store instructions; and wherein said allocator logic is also for allocating entries of said load buffer and said store buffer to said first instruction in response to assertion of said partial stall signal and for allocating entries of said load buffer and said store buffer to said second instruction in response to deassertion of said partial stall signal; and wherein said allocator logic is also for suspending allocating of entries of said load and store buffer to said first instruction and said second instruction in response to assertion of said full stall signal and for allocating entries of said load buffer and said store buffer to said first instruction and said second instruction in response to deassertion of said full stall signal.

39. A method of allocating resources of a processor during stall conditions, said method comprising the steps of:

issuing a first instruction and a second instruction within a common clock cycle;

providing a first buffer for containing source and result information pertaining to speculative instructions;

providing a second buffer for containing information pertaining to instructions pending execution;

asserting a partial stall condition if said second instruction is partially data dependent on a previous instruction;

asserting a full stall condition if said first buffer or said second buffer are full;

allocating said first instruction, and not said second instruction, to said first buffer and second buffer if said partial stall condition is asserted; and suspending allocation of said first instruction and said second instruction if said full stall condition is asserted.

40. A method of allocating resources of a processor as described in claim 39 further comprising the steps of:

allocating said second instruction to said first buffer and said second buffer if said partial stall condition becomes deasserted; and allocating said first instruction and said second instruction to said first buffer and said second buffer if said full stall condition becomes deasserted.

41. A method of allocating resources of a processor as described in claim 40 further comprising the step of deasserting said partial stall condition upon retirement of said previous instruction.

42. A method of allocating resources of a processor as described in claim 40 further comprising the step of deasserting said full stall condition upon said first buffer and said second buffer having vacancy for said first and said second instruction.

43. A method of allocating resources of a processor as described in claim 42 further comprising the steps of:

providing a load buffer for containing information pertaining to load instructions;

providing a store buffer for containing information pertaining to store instructions; and asserting said full stall condition if said load buffer is full or said store buffer is full.

44. A method of allocating resources of a processor as described in claim 43 further comprising the steps of:

allocating said second instruction to said load buffer and said store buffer if said partial stall condition becomes deasserted; and allocating said first instruction and said second instruction to said load buffer and said store buffer if said full stall condition becomes deasserted.

45. A method of allocating resources of a processor as described in claim 39 wherein said previous instruction is said first instruction.

46. A method of allocating resources of a processor as described in claim 39 further comprising the steps of:

providing allocation pointers to indicate entries of said first buffer and said second buffer for allocation; and providing a retirement pointer to said first buffer for indicating a last entry for retirement.

47. A method of allocating resources of a processor as described in claim 46 further comprising the steps of:

advancing said retirement pointer upon allocation of said first instruction upon assertion of said partial stall condition; and maintaining constant said allocation pointers while said partial stall condition is asserted.

* * * * *

UNITED STATES PATENT AND TRADEMARK OFFICE
CERTIFICATE OF CORRECTION

PATENT NO. : 5,524,263
DATED : June 4, 1996
INVENTOR(S) : Griffith et al.

It is certified that error appears in the above-indentified patent and that said Letters Patent is hereby corrected as shown below:

On the title page, in Section [19], replace "Griffth" with --Griffith--

On the title page, in Section [75], replace "Griffth" with --Griffith--

In column 2, at line 2, delete "Them" and substitute --There--

In column 2, at line 47, delete ":frozen)" and substitute --frozen)--

In column 2, at line 48, delete "(:full" and substitute --(full--

In column 5, at line 1, delete "them" and substitute --there--

In column 7, at line 24, delete "out-of order" and substitute --out-of-order--

UNITED STATES PATENT AND TRADEMARK OFFICE
CERTIFICATE OF CORRECTION

PATENT NO. : 5,524,263
DATED : June 4, 1996
INVENTOR(S) : Griffith et al

It is certified that error appears in the above-indentified patent and that said Letters Patent is hereby corrected as shown below:

In column 9, at line 53, delete "dam." and substitute --data.--

In column 17, at line 51, delete "am" and substitute --are--

In column 18, at line 5, delete "them" and substitute --there--

In column 22, at line 58, delete "tall" and substitute --tail--

In column 23, at line 42, delete "tile" and substitute --the--

In column 27, at line 18, delete "am" and substitute --are--

Signed and Sealed this

Sixteenth Day of September, 1997

Attest:

BRUCE LEHMAN

*Attesting Officer*      *Commissioner of Patents and Trademarks*